US012625593B2

(12) United States Patent
Nagano et al.

(10) Patent No.: US 12,625,593 B2
(45) Date of Patent: May 12, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Keijiroh Nagano, Tokyo (JP); Shingo Utsuki, Kanagawa (JP); Mari Saito, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 300 days.

(21) Appl. No.: 18/274,881

(22) PCT Filed: Feb. 10, 2022

(86) PCT No.: PCT/JP2022/005318
§ 371 (c)(1),
(2) Date: Jul. 28, 2023

(87) PCT Pub. No.: WO2022/196199
PCT Pub. Date: Sep. 22, 2022

(65) Prior Publication Data
US 2024/0104850 A1 Mar. 28, 2024

(30) Foreign Application Priority Data

Mar. 16, 2021 (JP) ................................ 2021-042141

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/011* (2013.01); *G06F 3/013* (2013.01);
(Continued)

(58) Field of Classification Search
None
See application file for complete search history.

(56) References Cited

U.S. PATENT DOCUMENTS

2013/0293586 A1* 11/2013 Kaino ...................... G06F 3/005
345/633
2013/0328928 A1* 12/2013 Yamagishi .............. A63F 13/25
345/633
(Continued)

FOREIGN PATENT DOCUMENTS

JP 2012-212345 A 11/2012
JP 2014-191718 A 10/2014
(Continued)

*Primary Examiner* — Jwalant Amin
(74) *Attorney, Agent, or Firm* — Paratus Law Group, PLLC

(57) ABSTRACT

An information processing apparatus according to an embodiment of the present technology includes an acquisition unit and a reproduction control unit. The acquisition unit acquires avoidance region information about an avoidance region where at least one of entrance of a target person who is a target to whom virtual content is reproduced or entrance of a virtual object for the target person that is displayed to the target person is a target to be avoided, the avoidance region information being generated on the basis of at least one of a position of another object different from the target person or a position of a virtual object for the other object displayed to the other object. The reproduction control unit controls reproduction of the virtual content to the target person on the basis of the acquired avoidance region information.

19 Claims, 22 Drawing Sheets

(51) Int. Cl.
  *G06T 19/00* (2011.01)
  *G02B 27/01* (2006.01)

(52) U.S. Cl.
  CPC ...... *G06T 19/00* (2013.01); *G02B 2027/0138*
        (2013.01); *G02B 27/0172* (2013.01); *G02B*
        *2027/0178* (2013.01); *G06T 2219/024*
                                          (2013.01)

(56) References Cited

U.S. PATENT DOCUMENTS

| | | | |
|---|---|---|---|
| 2017/0192620 A1* | 7/2017 | Kim .................... | G02B 27/0179 |
| 2017/0220863 A1* | 8/2017 | Lection .................. | G06V 20/58 |
| 2019/0279407 A1* | 9/2019 | McHugh ................ | G06F 3/011 |
| 2020/0060601 A1* | 2/2020 | Liu ...................... | A61B 5/6803 |
| 2021/0255458 A1* | 8/2021 | Yoon .................. | G02B 27/0101 |
| 2022/0253196 A1* | 8/2022 | Murata .................. | G06T 19/20 |

FOREIGN PATENT DOCUMENTS

| | | | | |
|---|---|---|---|---|
| JP | 2019-125215 A | 7/2019 | | |
| WO | WO-2014098033 A1 * | 6/2014 | ........... | A61B 5/6898 |
| WO | WO 2022/004422 A1 | 1/2022 | | |

\* cited by examiner

A

B

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/005318 (filed on Feb. 10, 2022) under 35 U.S.C. § 371, which claims priority to Japanese Patent Application No. 2021-042141 (filed on Mar. 16, 2021), which are all hereby incorporated by reference in their entirety.

TECHNICAL FIELD

The present technology relates to an information processing apparatus, an information processing method, and a program that can be applied to creation of an augmented reality (AR) space.

BACKGROUND ART

Patent Literature 1 has disclosed a technology capable of achieving an operation of an AR virtual object without interfering with user's immersion in the AR space.

CITATION LIST

Patent Literature

Patent Literature 1: Japanese Patent Application Laid-open No. 2012-212345

DISCLOSURE OF INVENTION

Technical Problem

It is thus desirable to provide a technology capable of achieving a high-quality AR experience.

In view of the above-mentioned circumstances, it is an objective of the present technology to provide an information processing apparatus, an information processing method, and a program that are capable of achieving a high-quality AR experience.

Solution to Problem

In order to accomplish the above-mentioned objective, an information processing apparatus according to an embodiment of the present technology includes an acquisition unit and a reproduction control unit.

The acquisition unit acquires avoidance region information about an avoidance region where at least one of entrance of a target person who is a target to whom virtual content is reproduced or entrance of a virtual object for the target person that is displayed to the target person is a target to be avoided, the avoidance region information being generated on the basis of at least one of a position of another object different from the target person or a position of a virtual object for the other object displayed to the other object.

The reproduction control unit controls reproduction of the virtual content to the target person on the basis of the acquired avoidance region information.

In this information processing apparatus, the reproduction of the virtual content to the target person is controlled on the basis of the avoidance region information about the avoidance region where the at least one of the entrance of the target person who is the target to whom the virtual content is reproduced or the entrance of the virtual object for the target person that is displayed to the target person is the target to be avoided. This can achieve a high-quality AR experience.

The reproduction control unit may control at least one of display of the virtual object for the target person or output of a virtual sound to the target person.

The reproduction control unit may execute at least one of reproduction of the virtual content for avoiding the entrance of the target person to the avoidance region or reproduction of the virtual content for avoiding the entrance of the virtual object for the target person to the avoidance region.

The reproduction control unit may move the position of the virtual object for the target person outward from the avoidance region.

The reproduction control unit may reproduce the virtual content for guiding a gaze of the target person so that the virtual object for the target person included in the avoidance region departs from an effective field of view of the target person.

The information processing apparatus may further include a generation unit that generates the avoidance region information on the basis of periphery information about a periphery of the target person.

The generation unit may generate the avoidance region information on the basis of at least one of a motion of the other object or a motion of the virtual object for the other object.

The generation unit may generate the avoidance region information including a region of a predetermined range as the avoidance region, the predetermined range using the position of the other object as a basis.

The other object may be another target person who is a target to whom another information processing apparatus reproduces the virtual content.

The generation unit may generate avoidance region information for the other target person on the basis of at least one of a position of the target person or a position of the virtual object for the target person.

The information processing apparatus may further include a sending control unit that sends avoidance region information for the other target person to the other information processing apparatus.

The information processing apparatus may further include a priority calculation unit that calculates a priority for reproduction of the virtual content based on the avoidance region information.

The sending control unit may send the calculated priority to the other information processing apparatus.

The reproduction control unit may compare the priority calculated by the priority calculation unit with the priority of the other target person sent from the other information processing apparatus and may control reproduction of the virtual content on the basis of the avoidance region information sent from the other information processing apparatus in a case where the priority of the other target person is higher.

The reproduction control unit may compare the priority calculated by the priority calculation unit with the priority of the other target person sent from the other information processing apparatus and does not need to control reproduction of the virtual content based on the avoidance region information sent from the other information processing apparatus in a case where the priority of the other target person is lower.

The information processing apparatus may further include an avoidance requirement level setting unit that sets an avoidance requirement level indicating how much avoidance is required with respect to an avoidance region included in the avoidance region information. In this case, the reproduction control unit may control reproduction of the virtual content on the basis of the avoidance requirement level.

The avoidance requirement level setting unit may set the avoidance requirement level with respect to an avoidance region included in the avoidance region information for the other target person. In this case, the sending control unit may send the set avoidance requirement level to the other information processing apparatus.

An information processing method according to an embodiment of the present technology is an information processing method executed by a computer system and includes:

acquiring avoidance region information about an avoidance region where at least one of entrance of a target person who is a target to whom virtual content is reproduced or entrance of a virtual object for the target person that is displayed to the target person is a target to be avoided, the avoidance region information being generated on the basis of at least one of a position of another object different from the target person or a position of a virtual object for the other object displayed to the other object.

Reproduction of the virtual content to the target person is controlled on the basis of the acquired avoidance region information.

A program according to an embodiment of the present technology causes a computer system to execute the following steps.

A step of acquiring avoidance region information about an avoidance region where at least one of entrance of a target person who is a target to whom virtual content is reproduced or entrance of a virtual object for the target person that is displayed to the target person is a target to be avoided, the avoidance region information being generated on the basis of at least one of a position of another object different from the target person or a position of a virtual object for the other object displayed to the other object.

A step of controlling reproduction of the virtual content to the target person on the basis of the acquired avoidance region information.

MODE(S) FOR CARRYING OUT THE INVENTION

Hereinafter, embodiments according to the present technology will be described with reference to the drawings.

First Embodiment

[AR Providing System]

Figure 1:
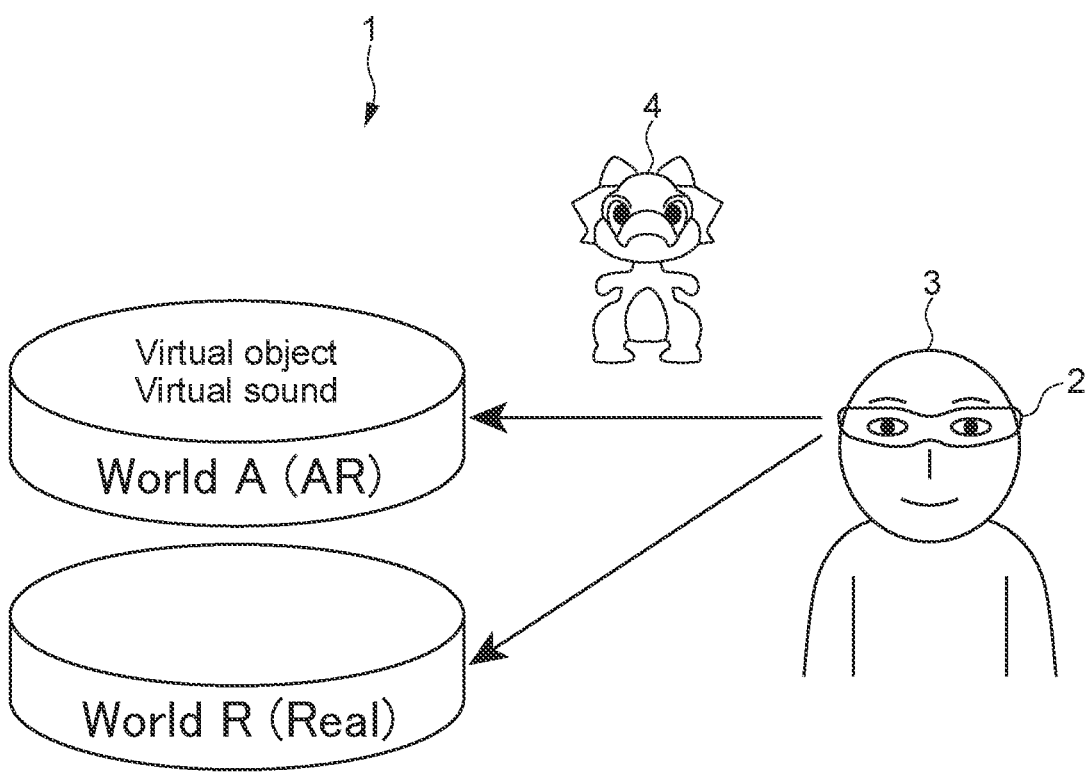
FIG. 1 A schematic diagram for outlining an AR providing system according to a first embodiment of the present technology.

FIG. 1 is a schematic diagram for outlining an AR providing system according to a first embodiment of the present technology. An AR providing system 1 corresponds to an embodiment of an information processing system according to the present technology.

The AR providing system 1 includes a head-mounted display (HMD) 2.

As shown in FIG. 1, the HMD 2 is put on the head of a user 3 for use.

The HMD 2 is an eyeglasses-type device with a see-through display. The HMD 2 is also called AR glasses.

In the present embodiment, the HMD 2 reproduces virtual content to the user 3. This can provide an AR space to the user 3 using the HMD 2. The user 3 can experience various AR worlds by using the HMD 2.

The reproduction of the virtual content includes displaying the virtual object to be superimposed on the real world. Moreover, the reproduction of the virtual content includes outputting virtual sounds. In addition, a smell, a sense of touch, and the like may be virtually provided to the user 3.

As shown in FIG. 1, an AR space (World A) is created for the user 3, based on a real world (World R). For example, an AR world where cute monsters are active as virtual objects 4 in a city of the real world is created.

As a matter of course, the displayed virtual objects 4 may include not only characters such as monsters, but also various virtual objects constituting the AR space, such as buildings and advertising boards. That is, the displayed virtual objects 4 may include any images such as computer graphics (CG) of characters, photographs, and words.

The output virtual sounds may include any sounds such as voices of characters such as monsters, a siren sound, and a door close sound effect.

In the present embodiment, the HMD 2 functions as an embodiment of an information processing apparatus according to the present technology. Moreover, the user 3 wearing the HMD 2 is an embodiment of a target person who is a target to whom virtual content is reproduced.

[Basic Operation]

Figure 2:
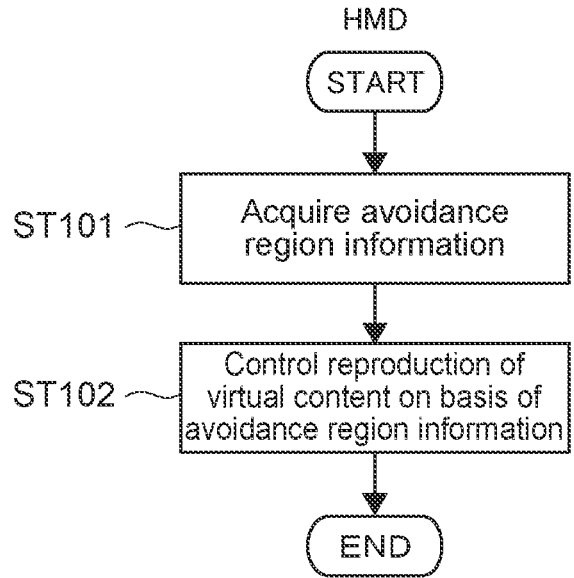
FIG. 2 A flowchart showing a basic operation example executed by an HMD.

FIG. 2 is a flowchart showing a basic operation example executed by the HMD 2.

The HMD 2 acquires avoidance region information (Step 101).

The avoidance region information is information generated on the basis of at least one of a position of another object different from the user 3 who is the target to whom the virtual content is reproduced or a position of the virtual object for the other object displayed to the other object.

For example, the avoidance region information may be generated with respect to any object such as a moving object, e.g., a person or vehicle surrounding the user 3. Alternatively, the kind of object that is a target with respect to which the avoidance region information is generated may be defined as appropriate.

Moreover, in a case where another user uses the HMD 2, the avoidance region information may be generated on the basis of a position of a virtual object for the other user that is displayed to the other user.

Moreover, the avoidance region information is information about an avoidance region where at least one of entrance of the user 3 or entrance of the virtual object 4 for the user 3 that is displayed to the user 3 is a target to be avoided.

For example, the avoidance region may be defined as a target where the entrance of the user 3 and the entrance of the virtual object 4 for the user 3 are both avoided. Alternatively, the avoidance region may be defined as a target where either one of the entrance of the user 3 and the entrance of the virtual object 4 for the user 3 is avoided. In any case, the present technology can be applied.

Moreover, in the present disclosure, the entrance to the avoidance region includes not only an operation of entering the avoidance region from the outside of the avoidance region, but also a state of having entered already the avoidance region.

Therefore, avoiding the entrance to the avoidance region includes not only avoiding an operation of entering the avoidance region, but also avoiding the state of having entered already the avoidance region.

Avoiding the state of having entered the avoidance region can also be said to be canceling the state of having entered the avoidance region.

For example, moving the user 3 or virtual object 4 located in the avoidance region outward from the avoidance region corresponds to canceling the state of having entered the avoidance region and includes avoiding the entrance to the avoidance region.

Moreover, a method for acquiring the avoidance region information is not limited.

The avoidance region information may be acquired by, for example, the HMD 2 generating the avoidance region information. Alternatively, the avoidance region information may be acquired by, for example, receiving the avoidance region information generated by another device or the like or reading out the avoidance region information stored in a recording medium or the like. Any other acquisition method can be used for making the avoidance region information available.

Therefore, in Step 101, the HMD 2 may generate the avoidance region information or the HMD 2 may receive the avoidance region information generated by the other device.

The HMD 2 controls the reproduction of the virtual content to the user 3 on the basis of the avoidance region information (Step 102).

For example, a virtual object is displayed or a virtual sound is output with respect to the avoidance region included in the avoidance region information in order to avoid the entrance of the user 3 himself or herself.

Alternatively, a virtual object is displayed or a virtual sound is output with respect to the avoidance region included in the avoidance region information in order to avoid the entrance of the virtual object 4 for the user 3.

This can avoid a situation where interference with a surrounding person or the like affects the world view of an AR space that a user is enjoying. Moreover, such avoidance itself can be executed without affecting the world view of the AR space. As a result, a high-quality AR experience can be achieved.

For example, if a runner passes by during face-to-face conversation with a virtual object 4 of a monster, the virtual object 4 of the monster can be displayed to be superimposed on that person. In this case, the world view of the AR world can be affected.

Moreover, it is assumed that when a user is enjoying running along the arrow in a case where, for example, a map and an arrow showing the running route are displayed as virtual objects 4, the arrow is superimposed on an approaching person. In this case, the user 3 may not enjoy running because the user 3 has to depart from the route shown by the arrow in order to avoid the person as a matter of course.

Moreover, such interference can also occur between a user 3 enjoying an AR world of virtual objects 4 of monsters and a user 3 enjoying an AR world of running. In this case, the world view of the AR world can be affected for both the users 3.

In addition, when the virtual object 4 of the monster is superimposed on the position of the virtual object 4 of the arrow showing the running route, the possibility that interference (e.g., collision) between the users 3 occurs increases. Thus, the virtual objects 4 approaching each other can also be problematic.

In the present embodiment, reproduction control of the virtual content based on the avoidance region information is executed. Accordingly, such a problem can be sufficiently suppressed, and a high-quality AR experience can be achieved.

It should be noted that the reproduction control of the virtual content based on the avoidance region information is not limited to reproduction control to prevent the user 3 and/or the virtual object 4 for the user 3 from entering the avoidance region. Using the avoidance region as a basis, various types of reproduction control may be executed so as not to affect the world view of the AR space.

Moreover, the processing shown in FIG. 2 is repeated at, for example, a predetermined frame rate. As a matter of course, the present technology is not limited to the case where the processing is executed on a frame-by-frame basis.

[HMD]

Figure 3:
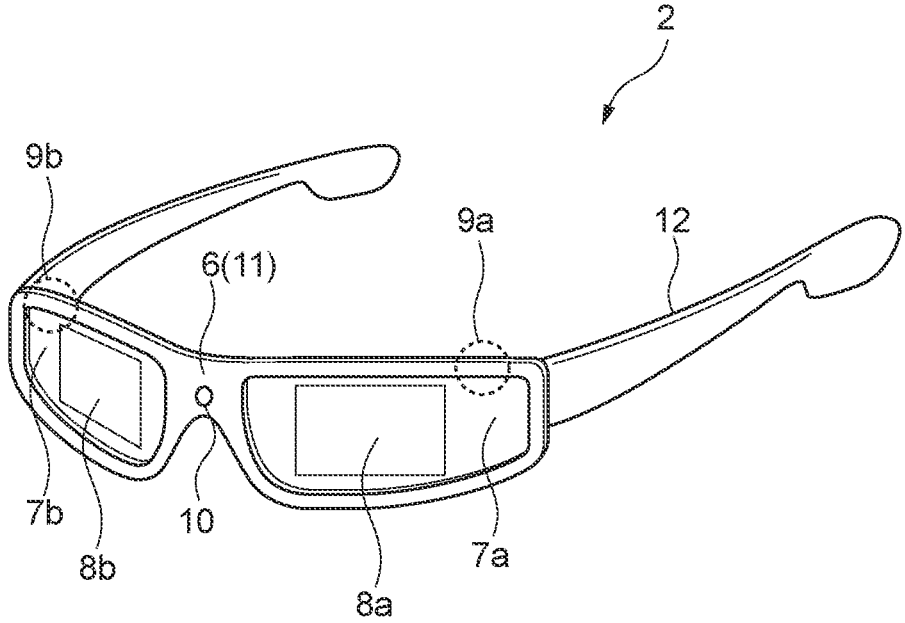
FIG. 3 A perspective view showing an outer appearance example of the HMD.

FIG. 3 is a perspective view showing an outer appearance example of the HMD 2.

The HMD 2 has a frame 6, a left eye lens 7a and a right eye lens 7b, a left eye display 8a and a right eye display 8b, a left eye camera 9a and a right eye camera 9b, and an outside camera 10.

The frame 6 has an eyeglasses-like shape and has a rim portion 11 and temples 12.

The rim portion 11 is a portion arranged in front of the left and right eyes of the user 3 and respectively supports the left eye lens 7a and the right eye lens 7b.

The temples 12 extend rearward to both ears of the user 3 from both ends of the rim portion 11. End portions of the temples 12 are attached to the both ears. The rim portion 11 and the temples 12 are made of a material, for example, the synthetic resin or metal.

The left eye lens 7a and the right eye lens 7b are respectively arranged in front of the left and right eyes of the user 3, covering at least a part of the field of view of the user 3.

Typically, the respective lenses are designed to correct the eyesight of the user 3. As a matter of course, the present technology is not limited thereto, and so-called non-prescription lenses may be used.

The left eye display 8a and the right eye display 8b are see-through displays. The left eye display 8a and the right eye display 8b are respectively arranged to cover a partial region of the left and right eye lenses 7a and 7b. That is, the left and right eye displays 8a and 8b are respectively arranged in front of the left and right eyes of the user 3.

The left and right eye displays 8a and 8b respectively display left and right eye images or the like. The user 3 wearing the HMD 2 can visually recognize a real scene and images displayed on the respective displays 8a and 8b at the same time.

Accordingly, the user 3 can experience an augmented reality (AR) or the like.

Each of the displays 8a and 8b displays, for example, the virtual object 4.

Examples of the left and right eye displays 8a and 8b include a see-through organic EL display and a liquid-crystal display (LCD).

In addition, specific configurations of the left and right eye displays 8a and 8b are not limited. A see-through display using any method, e.g., a display method of projecting an image on a transparent screen or a display method of displaying an image through a prism or the like may be used as appropriate.

The left eye camera 9a and the right eye camera 9b are provided in the frame 6 as appropriate so as to be capable of imaging the left and right eyes of the user 3. The left eye camera 9a and the right eye camera 9b are capable of detecting gaze information about the gaze of the user 3 or the like, for example, on the basis of left and right eye images captured by the left and right eye cameras 9a and 9b.

Examples of the left and right eye cameras 9a and 9b include a digital camera provided with an image sensor such as a complementary metal-oxide semiconductor (CMOS) sensor and a charge coupled device (CCD) sensor. Moreover, for example, an infrared camera with infrared light such as an infrared LED may be used.

Hereinafter, the left eye lens 7a and the right eye lens 7b will be sometimes both referred to as lenses 7 and the left eye display 8a and the right eye display 8b will be sometimes both referred to as see-through displays 8. Moreover, the left eye camera 9a and the right eye camera 9b will be sometimes both referred to as inside cameras 9. In the present embodiment, the see-through display 8 corresponds to a display unit.

The outside camera 10 is arranged in the middle of the frame 6 (rim portion 11), oriented outward (opposite to the user 3). The outside camera 10 is capable of imaging a real space included in the field of view of the user 3. Therefore, the outside camera 10 is capable of generating a captured image of the real space.

In the present embodiment, the outside camera 10 images an area, which is an area on the front side as viewed from the user 3 and includes a display region of the see-through display 8. That is, the outside camera 10 images the real space to include an area that the user 3 can see through the display region. Examples of the outside camera 10 include a digital camera with an image sensor such as a CMOS sensor and a CCD sensor.

It should be noted that the area that the user 3 can see through the display region is an area where the virtual object 4 can be superimposed on the real world. In the present disclosure, the area will be referred to as an effective field of view of the user 3. The effective field of view can also be said to be an angle of view where the virtual object 4 can be displayed.

Figure 4:
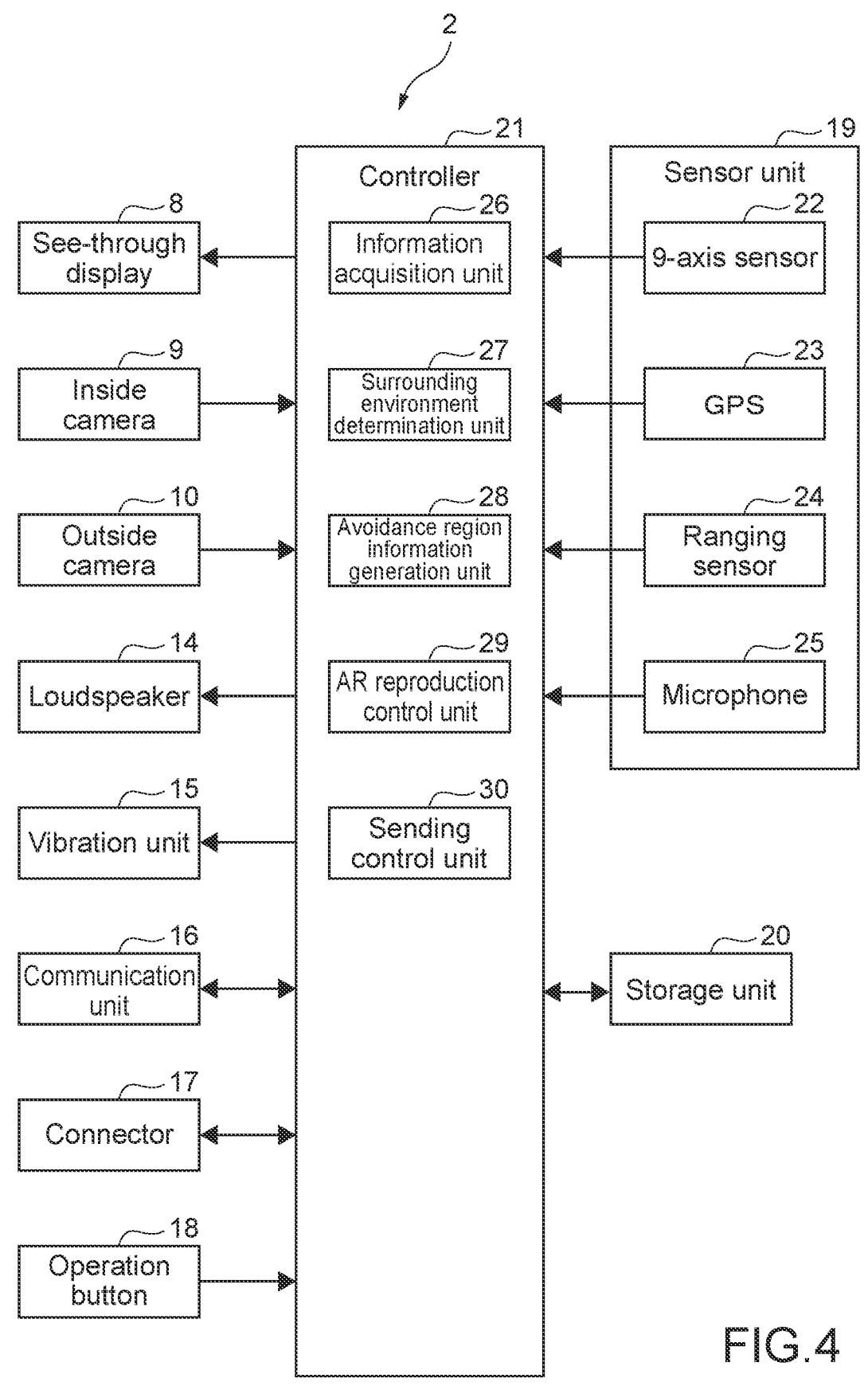
FIG. 4 A block diagram showing a functional configuration example of the HMD.

FIG. 4 is a block diagram showing a functional configuration example of the HMD 2.

As shown in FIG. 4, the HMD 2 further includes a loudspeaker 14, a vibration unit 15, a communication unit

16, a connector 17, an operation button 18, a sensor unit 19, a storage unit 20, and a controller 21.

The loudspeaker 14 is provided at a predetermined position in the frame 6. The configuration of the loudspeaker 14 is not limited. For example, the loudspeaker 14 capable of outputting stereo sound, monaural sound, or the like may be used as appropriate.

The vibration unit 15 is provided inside the frame 6 and generates a vibration. The vibration unit 15 is any vibration motor capable of generating a notifying vibration, for example.

The communication unit 16 is a module for network communication or near-field communication with the other device. A communication module, e.g., a wireless LAN module such as WiFi or Bluetooth (registered trademark) is provided.

The connector 17 is a terminal for connection with the other device. A terminal, e.g., a universal serial bus (USB) or high-definition multimedia interface (HDMI) (registered trademark) is provided. Moreover, a charging terminal of a charging stand (cradle) is connected to the connector 17 for charging.

The operation button 18 is provided at a predetermined position in the frame 6, for example. The operation button 18 enables power-on/off operations and operations related to various functions of the HMD 2, such as image display and audio output-related functions and a network communication function.

The sensor unit 19 includes a 9-axis sensor 22, a GPS 23, a ranging sensor 24, and a microphone 25. The 9-axis sensor 22 includes a 3-axis acceleration sensor, a 3-axis gyro sensor, and a 3-axis compass sensor. The 9-axis sensor 22 is capable of detecting accelerations, angular velocities, and directions of the HMD 2 in three axes. In addition, an inertial measurement unit (IMU) sensor having any configuration may be used.

The GPS 23 acquires information about a current position of the HMD 2. Detection results of the 9-axis sensor 22 and the GPS 23 are used for detecting attitude and position of the user 3 (HMD 2) and a movement (motion) of the user 3, for example. These sensors are provided at, for example, predetermined positions in the frame 6.

The ranging sensor 24 is capable of acquiring three-dimensional information (distance to a detection target). Examples of the ranging sensor 24 include light detection and ranging, laser imaging detection and ranging (LiDAR), a laser ranging sensor, a stereo camera, a time of flight (ToF) sensor, an ultrasonic sensor, and a structured-light ranging sensor. Alternatively, a sensor having both functions of image sensor and ranging sensor may be used.

The ranging sensor 24 is mounted, for example, using the front side of the user 3 as a detection direction. That is, the ranging sensor 24 is mounted to be capable of measuring a distance in the real space included in the field of view of the user 3. The present technology is not limited thereto, and the ranging sensor 24 may be mounted to be capable of measuring a distance in a 360-degree entire periphery around the user 3 set as a center.

The microphone 25 detects information about a sound in the periphery of the user 3. The microphone 25 detects, for example, a speech uttered by the user 3 as appropriate. This enables the user 3 to, for example, enjoy an AR experience during phone call or input an operation on the HMD 2 by voice input.

The type of sensor provided as the sensor unit 19 is not limited. Any sensor may be provided. For example, a thermal sensor and a humidity sensor capable of measuring temperature and humidity of an environment where the HMD 2 is used may be provided. Moreover, a biometric sensor capable of detecting biometric information of the user 3 may be provided. Examples of the biometric sensor include an electroencephalography sensor, an electromyography sensor, a pulse sensor, a sweat sensor, a thermal sensor, a blood flow sensor, and a body movement sensor.

The inside camera 9 and the outside camera 10 can also be considered as a part of the sensor unit 19.

The storage unit 20 is a storage device such as a nonvolatile memory. Examples of the storage unit 20 include a hard disk drive (HDD) and a solid state drive (SSD). In addition, any computer-readable non-transitory storage medium may be used.

The storage unit 20 stores, for example, map data. The map data functions as map data about the real space. The storage unit 20 stores, for example, map data about the real world where the user 3 experiences the AR world.

Moreover, the storage unit 20 stores a control program for comprehensively controlling operations of the HMD 2.

Moreover, the storage unit 20 stores various types of information about an AR application for providing the AR space. The storage unit 20 stores, for example, various types of information and data according to the present technology, e.g., content data such as the virtual object 4 and the virtual sound and the above-mentioned avoidance region information.

A method for installing the map data, the control program, the content data, and the like to the HMD 2 is not limited.

For example, the AR application according to the present technology may be provided as a cloud service. In this case, the HMD 2 installs an application program for configuring the AR space from a content provider server in a network. As a matter of course, the present technology is not limited to such an aspect.

The controller 21 controls the operation of each block of the HMD 2. The controller 21 has hardware circuits necessary for a computer, e.g., a CPU and memories (RAM, ROM). The CPU executes a program according to the present technology stored in the storage unit 20 or the memory, thereby executing various types of processing.

Examples of the controller 21 include a programmable logic device (PLD) such as a field programmable gate array (FPGA) and another device such as an application specific integrated circuit (ASIC).

In the present embodiment, the CPU of the controller 21 executes the program according to the present technology (e.g., an application program), thereby achieving, as functional blocks, an information acquisition unit 26, a surrounding environment determination unit 27, an avoidance region information generation unit 28, an AR reproduction control unit 29, and a sending control unit 30.

Then, these functional blocks execute an information processing method according to the present embodiment. It should be noted that dedicated hardware such as an integrated circuit (IC) may be used as appropriate for achieving each functional block.

The information acquisition unit 26 is capable of, for example, acquiring various types of information from each unit of the HMD 2 and outputting them to each functional block of the controller 21.

The information acquisition unit 26 is capable of, for example, acquiring image information captured by the inside camera 9 and the outside camera 10, detection results (sensor information) of the respective sensors of the sensor unit 19, and the like.

Moreover, the information acquisition unit may be capable of acquiring various types of information received from the other device via the communication unit 16.

The information acquisition unit may be capable of receiving various types of information about the AR appli- cation that the user 3 experiences from a predetermined server in the network, for example. The information acqui- sition unit acquires, for example, reservation information of a place for experiencing the AR world, the number of participant users who experience the same AR world, and microtransaction information performed for experiencing the AR world.

Moreover, the information acquisition unit may be capable of acquiring, for example, images from cameras provided in walls, poles, etc. in the real world for which the AR world has been created and sensor information of ranging sensors, etc.

The surrounding environment determination unit 27 gen- erates periphery information about the periphery of the user 3 (HMD 2).

As to the periphery information, for example, a surround- ing environment of the user 3 is determined on the basis of image information captured by the inside camera 9 and the outside camera 10, detection results (sensor information) of the respective sensors of the sensor unit 19, and the like.

For example, images from cameras provided in walls, poles, etc. in the real world for which the AR world has been created and sensor information of ranging sensors, etc. may be used. This allows accurate generation of the periphery information.

Examples of the periphery information include the fol- lowing information.

Presence/absence of the object . . . an area as a determi- nation target, such as presence/absence of the object, may be defined.

Kind of the object . . . a person, an animal, a vehicle, a train, a road, a tree, a building, a still object, a moving object, etc.

State of the object . . . an orientation, an attitude, a still state, an operation state, etc. of the object Motion of the object . . . walking (including direction and speed), running (including direction and speed), jump- ing (including a height), talking, etc.

Shape of the object (including a size)

Predicted motion of the object

Distance to the object

In addition, any information about the periphery of the user 3 may be generated.

A method of generating the periphery information is not limited. Any technology may be used.

Any image recognition technology, for example, match- ing processing, edge detection, or a homography using a model image of the object may be used. Moreover, born estimation or the like may be used.

Moreover, a library having functions of existing image processing, machine learning, and the like created outside may be used.

Any machine learning algorithm using, for example, a deep neural network (DNN) may be used for generating the periphery information. For example, the use of artificial intelligence (AI) for deep learning can improve the periph- ery information generation accuracy.

For example, semantic segmentation of the image infor- mation can determine the kind of object for each pixel of the image.

It should be noted that a machine learning algorithm may be applied to any processing in the present disclosure.

Moreover, in the present embodiment, the surrounding environment determination unit 27 defines a coordinate system with respect to a space in the effective field of view on which the virtual object 4 can be superimposed.

For example, a coordinate value (e.g., XYZ coordinate value) defined by an absolute coordinate system (world coordinate system) may be used. Alternatively, a coordinate value (e.g., xyz coordinate value or uvd coordinate value) defined by a relative coordinate system using a predeter- mined point as a basis (point of origin) may be used. In a case of using the relative coordinate system, the point of origin as the basis may be arbitrarily set.

For example, a relative coordinate system using world coordinates of a predetermined real object in the effective field of view as the point of origin may be defined.

The surrounding environment determination unit 27 gen- erates the periphery information such as the position and orientation of the object by using the defined coordinate value as appropriate.

It should be noted that an imaging area of the outside camera 10 and a measurement area of the ranging sensor 24 may be set to not only a space in the effective field of view but also the left, right, and the back. In this case, the periphery information may be generated by defining a coordinate system with respect to a space outside the effec- tive field of view.

A range to define the coordinates and a range to generate the periphery information, e.g., any one of the front, back, left, and right or multiple directions or a 360-degree entire periphery, may be set as appropriate.

The surrounding environment determination unit 27 may estimate a self-position of the user 3 (HMD 2).

For example, the self-position includes position and atti- tude of the HMD 2. For example, the self-position estima- tion can calculate position information of the HMD 2 in the map data and attitude information regarding which direction the HMD 2 faces.

The self-position of the HMD 2 is calculated on the basis of, for example, detection results from the sensor unit 19 and images captured by the inside camera 9 and the outside camera 10.

For example, position coordinates in a three-dimensional coordinate system (XYZ coordinate system) defined by the surrounding environment determination unit 27 are calcu- lated. Moreover, a pitch angle, a roll angle, and a yaw angle about a predetermined reference axis extending on the front side of the user 3 (HMD 2) in a case where the X-axis is set as a pitch axis, the Y-axis is set as a roll axis, and the Z-axis is set as a yaw axis are calculated.

As a matter of course, specific forms and the like of the position information and the attitude information of the user 3 (HMD 2) are not limited.

An algorithm for estimating the self-position of the HMD 2 is not also limited. Any algorithm such as simultaneous localization and mapping (SLAM) may be used. In addition, any machine learning algorithm and the like may be used.

Three-dimensional coordinates of the periphery may be defined on the basis of the self-position.

Moreover, a self-position estimation unit may be config- ured as a functional block different from the surrounding environment determination unit 27.

The avoidance region information generation unit 28 generates avoidance region information.

In the present embodiment, the avoidance region infor- mation generation unit 28 generates the avoidance region information on the basis of the periphery information.

The AR reproduction control unit 29 controls the reproduction of the virtual content to the user 3.

How the virtual object 4 will move, how the virtual sound will be heard, and the like in accordance with the world view of the AR world, for example, are determined. Then, the virtual object 4 is displayed on the see-through display 8 so as to achieve the determined contents. Moreover, the loudspeaker 14 outputs the virtual sound.

As to the display of the virtual object 4, a display position of the virtual object 4 is calculated on the basis of, for example, the three-dimensional coordinates defined by the surrounding environment determination unit 27. The calculated display position (three-dimensional coordinates) is converted into two-dimensional coordinates (display coordinates on the see-through display 8) by a homography or the like. The virtual object 4 is displayed at the converted display coordinates. This achieves an AR space where the virtual object 4 is located at a desired position in the real space.

As to the output of the virtual sound, a generation position of the virtual sound (position of a virtual sound source) is calculated on the basis of, for example, the three-dimensional coordinates defined by the surrounding environment determination unit 27. An AR space where the virtual sound can be heard from a desired position (desired direction) in the real space is achieved by controlling the loudspeaker 14 to adjust localization of the sound.

A specific algorithm for reproducing the virtual content is not limited. Any control may be executed.

The sending control unit 30 is capable of sending various types of information to the other device via the communication unit 16. For example, the sending control unit 30 is capable of sending to the other device the information acquired by the information acquisition unit 26, the periphery information generated by the surrounding environment determination unit 27, the avoidance region information and the like generated by the avoidance region information generation unit 28, the display position and the like of the virtual object 4 calculated by the AR reproduction control unit 29, and the information and the like stored in the storage unit 20.

In the present embodiment, the avoidance region information generation unit 28 corresponds to an embodiment of a generation unit according to the present technology. Moreover, in the present embodiment, the avoidance region information generation unit 28 generates and acquires the avoidance region information. Thus, the avoidance region information generation unit 28 also functions as an embodiment of an acquisition unit according to the present technology.

The AR reproduction control unit 29 corresponds to an embodiment of a reproduction control unit according to the present technology.

[Reproduction Operation of Virtual Content]

Figure 5:
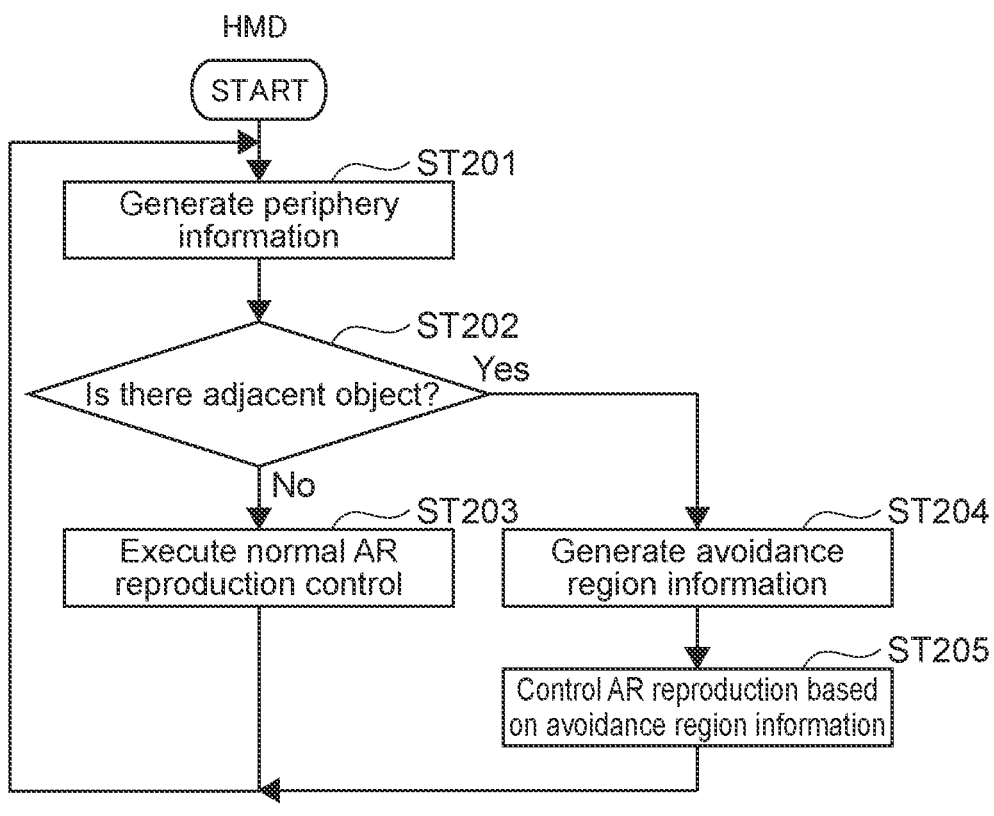
FIG. 5 A flowchart showing a reproduction operation example of virtual content by the HMD.

FIG. 5 is a flowchart showing a reproduction operation example of the virtual content by the HMD 2.

FIGS. 6 to 14 are schematic diagrams for describing each of steps shown in FIG. 5.

In the present embodiment, executing the processing shown in FIG. 5 at a predetermined frame rate achieves the AR space. As a matter of course, the present technology is not limited thereto.

The surrounding environment determination unit 27 generates periphery information (Step 201).

Moreover, the surrounding environment determination unit 27 determines whether or not there is an adjacent object (Step 202).

For example, the surrounding environment determination unit 27 determines whether or not an object is located in an area from the user 3 (HMD 2) to a predetermined distance within the detection areas of the outside camera 10 and the ranging sensor 24. For example, the surrounding environment determination unit 27 determines whether or not an object is located in an area of 10 m or less from the user 3 (HMD 2). As a matter of course, the present technology is not limited to 10 m. Any area may be set.

Figure 6:
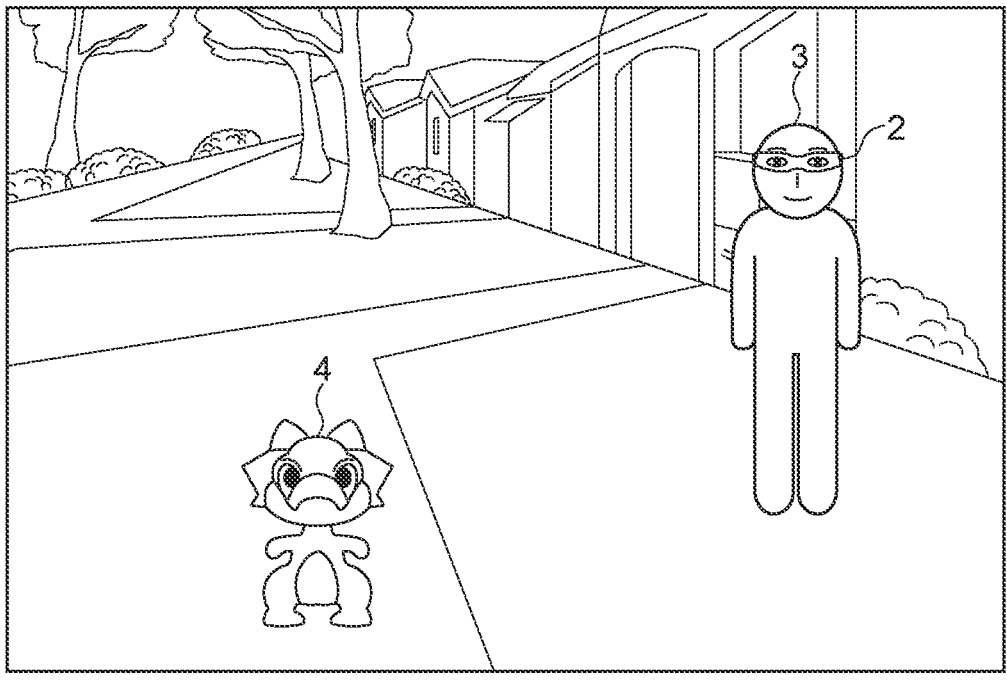
FIG. 6 A schematic diagram showing a display example of a virtual object.

In a case where an object adjacent is not located at the periphery of the user 3 viewing the virtual object 4 through the HMD 2 (No in Step 202) as shown in FIG. 6, the AR reproduction control unit 29 executes normal reproduction control of the virtual content (Step 203).

The normal reproduction control of the virtual content is reproduction control that is not reproduction control based on the avoidance region information. For example, normal display of the virtual object 4 or normal output of the virtual sound according to the AR application is executed.

The user 3 can sufficiently enjoy the world view of the AR world.

Figure 7:
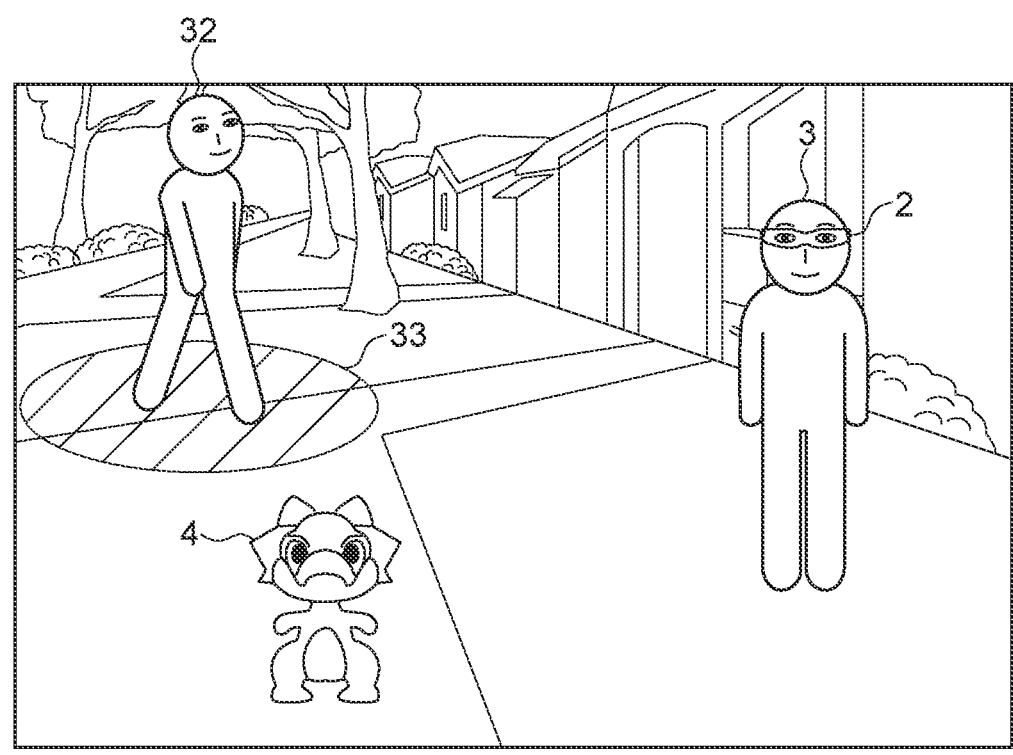
FIG. 7 A schematic diagram showing a setting example of an avoidance region.
Figure 8:
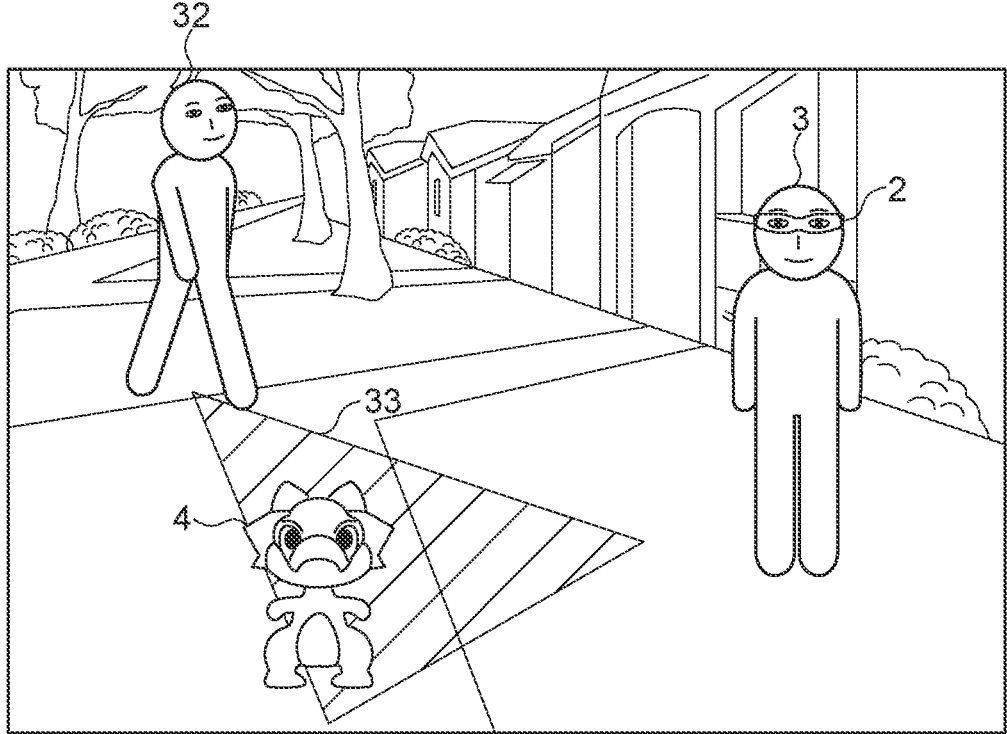
FIG. 8 A schematic diagram showing a setting example of an avoidance region.
Figure 9:
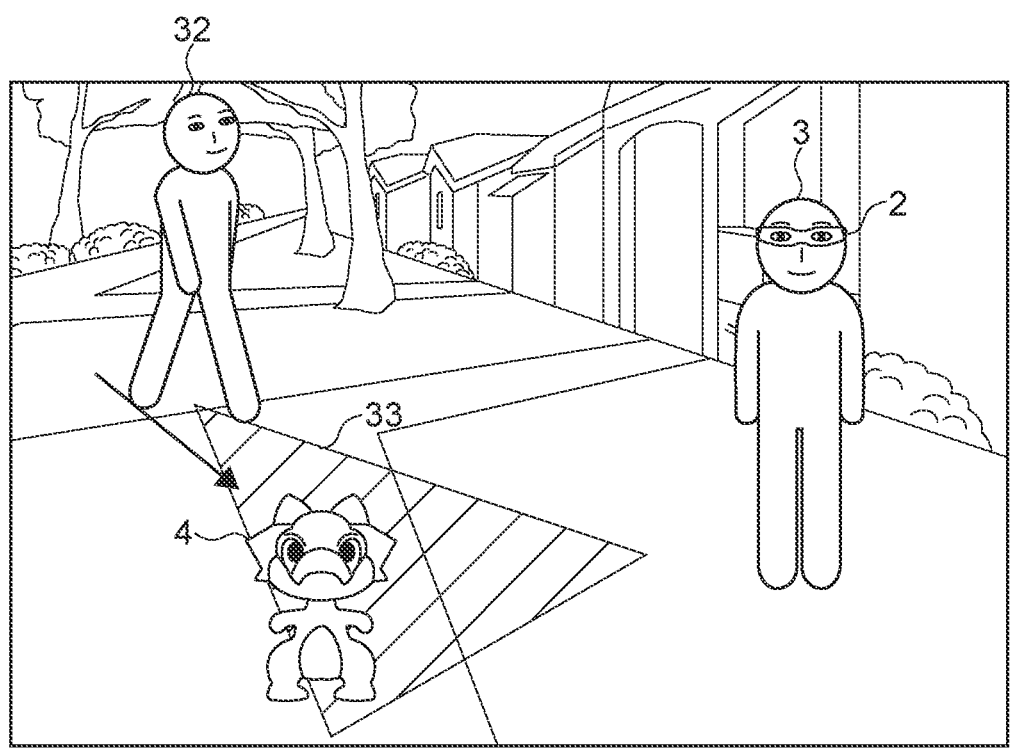
FIG. 9 A schematic diagram showing a setting example of an avoidance region.

It is assumed that another adjacent person 32 is located at the periphery of the user 3 as shown in FIGS. 7 to 9. In this case, the surrounding environment determination unit 27 determines that an adjacent object is located (Yes in Step 202), and the avoidance region information generation unit 28 generates avoidance region information (Step 204).

In the example shown in FIGS. 7 to 9, the avoidance region information generation unit 28 generates avoidance region information using a region of a predetermined range based on a position (e.g., center position) of the other person 32 as an avoidance region 33.

In a case where there is a person or another object, a region at the periphery of the person or the like is set as the avoidance region 33 because the person or the like will move there with a high possibility.

In the example shown in FIG. 7, a circular region having a predetermined length centered at the other person 32 as a radius is set as the avoidance region 33. As a matter of course, the shape of the avoidance region 33 is not limited. The avoidance region 33 may be elliptical or polygonal.

Moreover, the size of the avoidance region 33 is also not limited. Any numeric value, e.g., a radius of 3 m may be set.

In FIG. 8, the avoidance region 33 is set using the orientation of the other person 32 as a parameter. The avoidance region 33 is set on the basis of the orientation because a moving object including the person or the like often moves in a direction that it faces.

The avoidance region 33 having a predetermined shape, for example, a triangle shape, a rectangular shape, a circular shape, an elliptical shape, or a polygonal shape is set in front of the other person 32 in a direction that the other person 32 faces.

In a case of using the avoidance region 33 that is the isosceles triangle as shown in FIG. 8, the apex of the isosceles triangle is adjusted to the position of the other person 32. Then, a normal extending to the base from the apex angle of the isosceles triangle is adjusted to the direction/orientation of the other person 32.

In addition, any setting method reflecting the orientation of the other person 32 may be employed.

In FIG. 9, a motion of the other person 32 is used as a parameter. Specifically, the motion of the other person 32 is predicted and a motion vector representing a predicted movement direction (orientation) of the other person 32 and movement velocity is calculated. The avoidance region 33 is set on the basis of the motion vector.

An avoidance region 33 having a predetermined shape, e.g., a triangular, rectangular, circular, elliptical, or polygonal shape is set in front of the other person 32 in the direction of the motion vector. The size of the avoidance region 33 may be adjusted as appropriate in accordance with the magnitude of the motion vector.

In a case of using the avoidance region 33 of the isosceles triangle as shown in FIG. 9, the apex of the isosceles triangle is adjusted to the position of the other person 32. Then, the normal extending to the base from the apex angle of the isosceles triangle is adjusted to the direction of the motion vector. Moreover, the avoidance region 33 constituted by the isosceles triangle may be set so that the magnitude of the normal equals the magnitude of the motion vector.

In this manner, the avoidance region information may be generated on the basis of the motion of the other person 32. The motion prediction allows highly accurate setting of the avoidance region 33.

The avoidance region 33 is set on the basis of, for example, the three-dimensional coordinates defined by the surrounding environment determination unit 27.

A stereoscopic region may be set as the avoidance region 33. For example, a conical or square pyramid shape extending on the front side of the other person 32, for example, using the position of the other person 32 as the apex, may be set as the avoidance region 33.

It should be noted that the avoidance region 33 is typically retained as data, not displayed visibly to the user 3. This can prevent destruction of the world view of the AR world. However, the avoidance region 33 may be displayed to the user 3 in application of the present technology.

Referring back to FIG. 5, the AR reproduction control unit 29 controls reproduction of the virtual content on the basis of the avoidance region information (Step 205).

Figure 10:
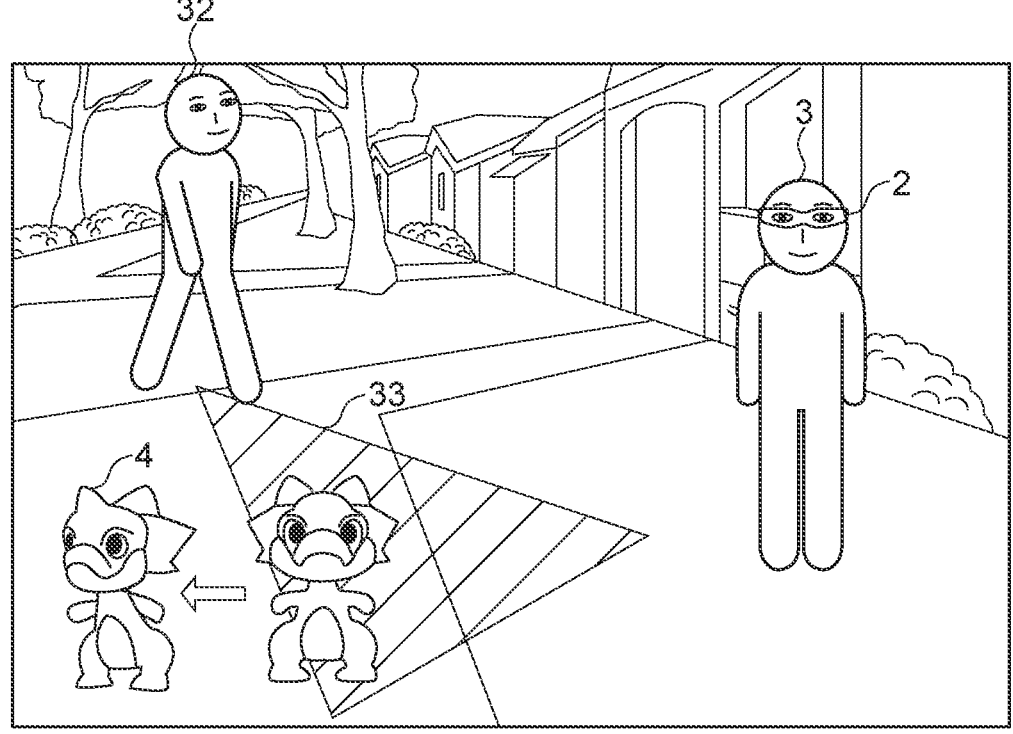
FIG. 10 A schematic diagram showing a reproduction control example of the virtual content based on the avoidance region.
Figure 11:
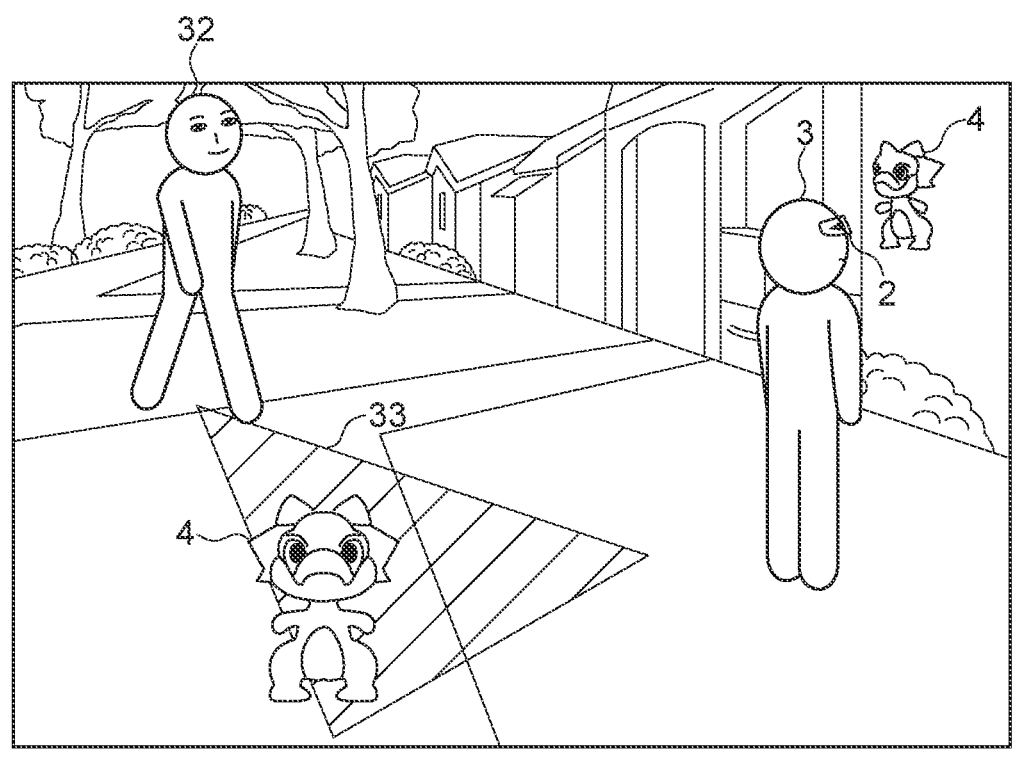
FIG. 11 A schematic diagram showing a reproduction control example of the virtual content based on the avoidance region.

For example, as shown in FIGS. 10 and 11, reproduction of the virtual content for avoiding the entrance of the virtual object 4 to the avoidance region 33 is executed. That is, reproduction control to prevent the virtual object 4 from entering the avoidance region 33 is executed.

The reproduction of the virtual content is typically executed, keeping the world view of the AR world.

In a case where as shown in FIG. 10, the virtual object 4 is located in the avoidance region 33, i.e., in a case where the avoidance region 33 includes the position of the virtual object 4, the position of the virtual object 4 is moved outward from the avoidance region 33.

For example, the virtual object 4 is moved in a natural manner so as not to affect the world view of the AR world. Display in which for example a monster character walks, runs, or jump out from the avoidance region 33 is executed.

For example, in a case where the arrow showing the running route is displayed as the virtual object 4, the display of the arrow is changed so that the arrow becomes a path to avoid the avoidance region 33.

In addition, any AR representation may be employed.

As shown in FIG. 11, virtual content for guiding the gaze of the user 3 may be reproduced so that the virtual object 4 for the user 3 included in the avoidance region 33 departs from the effective field of view of the user 3.

In the example shown in FIG. 11, a virtual object 4 of another monster character is displayed opposite to the virtual object 4 included in the avoidance region 33. This can make the user 3 to look back for removing the virtual object 4 that is superimposed on the avoidance region 33 from the effective field of view.

For example, as to the virtual object 4 of the other character, the original virtual object 4 may be displayed at any position so as not to enter the effective field of view (angle of view). For example, with an AR glass having an angle of view of horizontal 90 degrees, assuming that the front direction is 0 degrees, another virtual object 4 is displayed between 45 degrees to 315 degrees in a case where the original virtual object 4 is located at the center of the angle of view.

Pulling the attention of the user 3 in another direction in this manner can also avoid the entrance of the virtual object 4 to the avoidance region 33. In this case, it can also be said that it avoids viewing of the state in which the virtual object 4 has entered the avoidance region 33.

Any other reproduction control may be executed as reproduction of the virtual content for guiding the gaze of the user 3. For example, a virtual sound of the monster calling the user 3 from an opposite side may be output.

In addition, any AR representation may be employed.

The reproduction control based on the avoidance region information may end, for example, when the entrance of the virtual object 4 to the avoidance region 33 is avoided. Then, it may return to the normal reproduction control.

Alternatively, whether the entrance of the virtual object 4 to the avoidance region 33 has been avoided may be determined after the original reproduction control. Then, it may be switched to the normal reproduction control in a case where it is determined that the normal reproduction control will cause no problem on the basis of a positive determination result.

Moreover, for the reproduction control based on the avoidance region information, the contents of the reproduction control may be set to vary in accordance with for example a situation of the user 3, e.g., morning/night and city/countryside.

Figure 12:
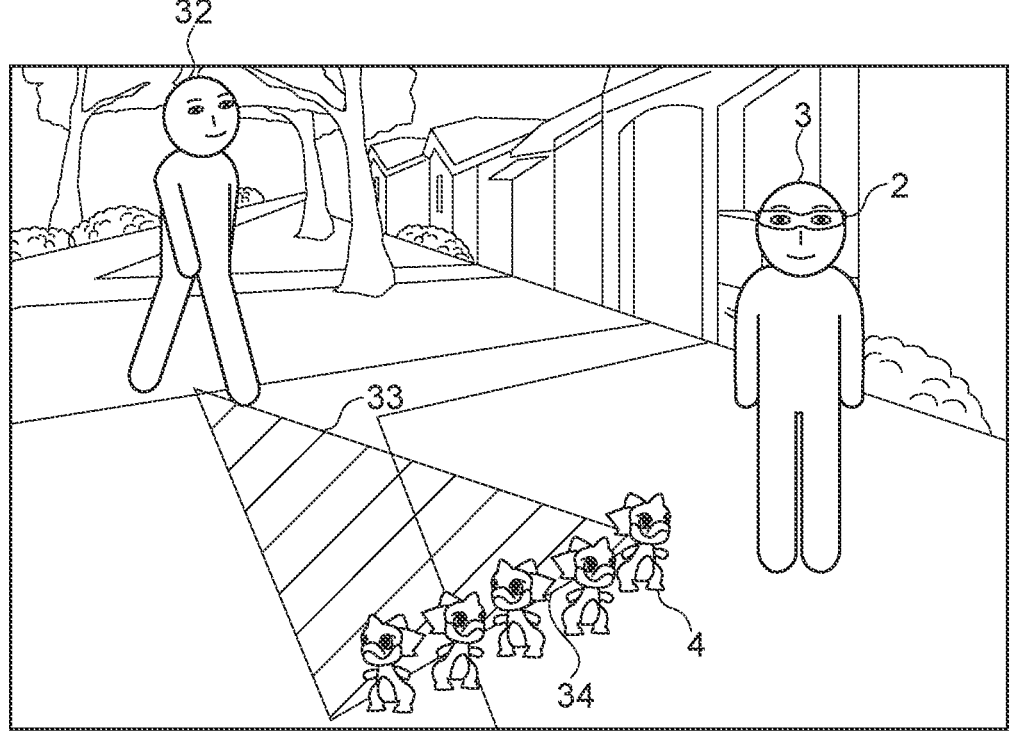
FIG. 12 A schematic diagram showing a reproduction control example of the virtual content based on the avoidance region.
Figure 13:
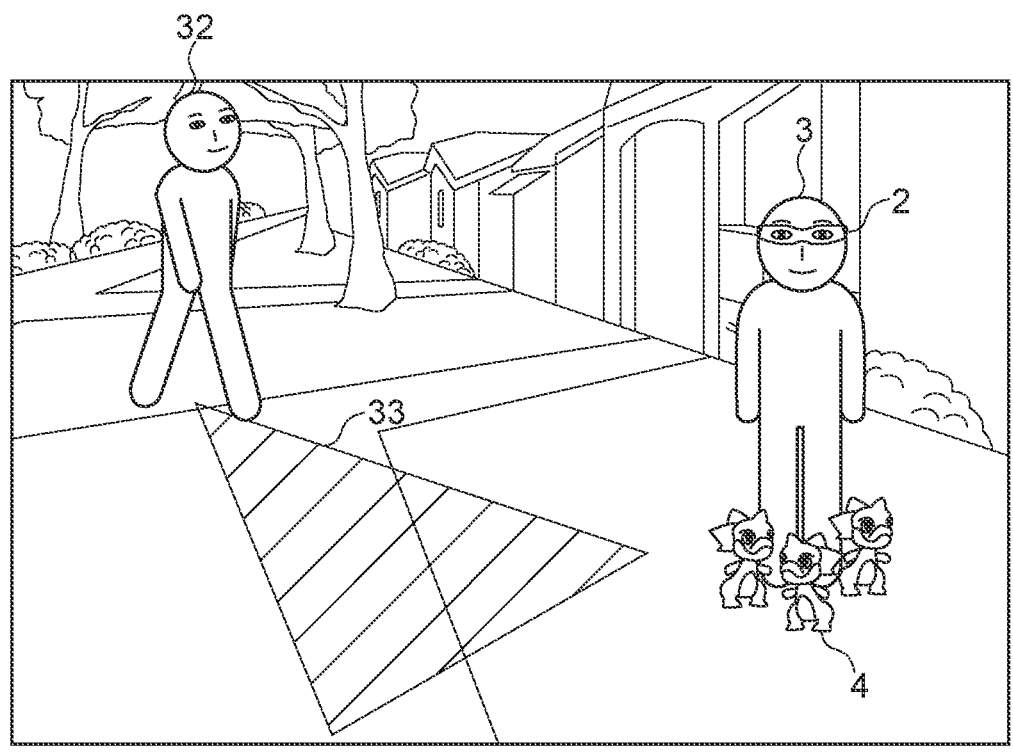
FIG. 13 A schematic diagram showing a reproduction control example of the virtual content based on the avoidance region.
Figure 14:
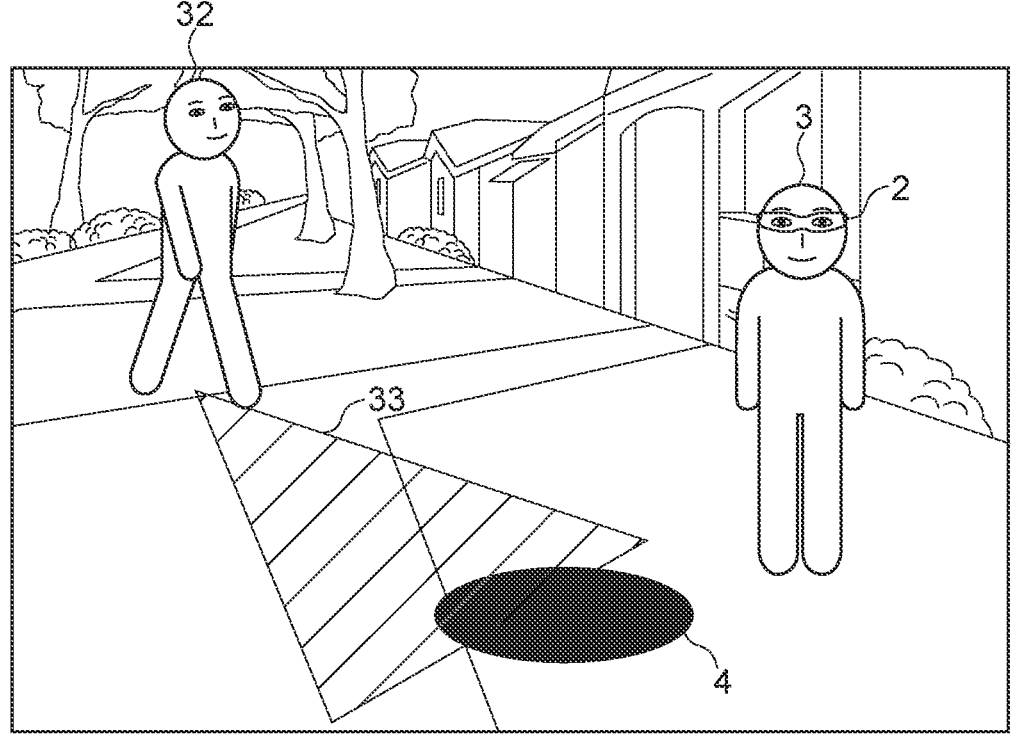
FIG. 14 A schematic diagram showing a reproduction control example of the virtual content based on the avoidance region.

As shown in FIGS. 12 to 14, reproduction of the virtual content for avoiding the entrance of the user 3 to the avoidance region 33 may be executed. That is, reproduction control to prevent the user 3 from entering the avoidance region 33 may be executed.

The reproduction of the virtual content is typically executed, keeping the world view of the AR world.

In the example shown in FIG. 12, virtual display in which virtual objects 4 constituted by a plurality of monsters are dancing on the way of the user 3 in a peripheral portion 34 of the avoidance region 33 is executed. This can prevent the user 3 from entering the avoidance region 33.

The present technology is not limited to the example shown in FIG. 12. Various virtual display in which a virtual object 4 of a character or the like moves or talks to the user 3 between the avoidance region 33 and the user 3 may be executed. Such virtual display can prevent the user 3 from moving beyond the virtual object 4 of the character or the like.

In the example shown in FIG. 13, reproduction of the virtual content for stopping the motion of the user 3 is executed.

Specifically, virtual display in which virtual objects 4 of monsters are dancing so close to the feet of the user 3 that the user 3 cannot move is executed. This can prevent the user 3 from entering the avoidance region 33.

In addition, any reproduction control that can stop the motion of the user 3 while keeping the world view of the AR world may be executed. For example, a virtual sound saying "close your eyes and say a magic spell right there" by a monster's voice may be output. Alternatively, a virtual sound saying "stop there and take a deep breath" by a running trainer's voice may be output.

In the example shown in FIG. 14, a virtual object 4 of a pitfall is displayed in the peripheral portion 34 of the avoidance region 33.

Depending on the contents of the AR world, the pitfall can mismatch the world view. On the other hand, the pitfall is widely known as one that people should avoid entering, so it is an effective object for stopping the advance of the user 3. Thus, displaying the virtual object 4 of the pitfall between the avoidance region 33 and the user 3 can avoid the entrance to the avoidance region 33.

Such a virtual object that mismatches the world view of the AR world may be used for avoiding the entrance of the user 3 to the avoidance region 33.

For example, reproduction control keeping the world view of the AR world as shown in FIGS. 12 and 13 is first executed to prevent approach to the avoidance region 33. Then, the virtual object 4 of the pitfall as shown in FIG. 14 is displayed if the user 3 is coming too close to the avoidance region 33. Such a processing flow may be employed.

It should be noted that as to the display of the virtual object 4, a method of cutting the real world like a pitfall may be employed or for example a method of adding something to the real world, e.g., displaying an off-limits sign may be employed.

It should be noted that more effectively, the normal reproduction of the virtual content is executed as much as possible in order to keep the world view of the AR world. Otherwise, more desirably, the reproduction control based on the avoidance region information has a smaller change from the normal reproduction control.

From such a perspective, specific contents of the reproduction control based on the avoidance region information may be determined as appropriate. For example, a setting that only reproduction of the virtual content for avoiding the entrance of the virtual object 4 to the avoidance region 33 as shown in FIGS. 10 and 11 is employed and reproduction of the virtual content for avoiding the entrance of the user 3 to the avoidance region 33 as shown in FIGS. 12 to 14 is not employed can also be made.

For example, depending on the contents of the AR application, the other person 32 or the like may be able to sufficiently avoid the user 3 as to overlap between the user 3 and the avoidance region 33 in a case where only overlap between the virtual object 4 and the avoidance region 33 has been avoided.

Specific contents of the reproduction control based on the avoidance region information may be determined as appropriate on the basis of the contents of the AR application.

Hereinabove, the HMD 2 according to the present embodiment controls the reproduction of the virtual content to the user 3 on the basis of the avoidance region information about the avoidance region 33 where at least one of the entrance of the user 3 that is the target to whom the virtual content is reproduced or the entrance of a virtual object for the user 3 that is displayed to the user 3 is a target to be avoided.

This can prevent a situation where interference with a person or the like in the periphery affects the world view of the AR space that the user is enjoying. Moreover, such avoidance itself can be executed without affecting the world view of the AR space. As a result, a high-quality AR experience can be achieved.

Second Embodiment

An AR providing system in a second embodiment according to the present technology will be described. Hereinafter, descriptions of portions similar to the configurations and actions of the AR providing system 1 and the HMD (information processing apparatus) 2 described in the above embodiment will be omitted or simplified.

[AR Providing System]

Figure 15:
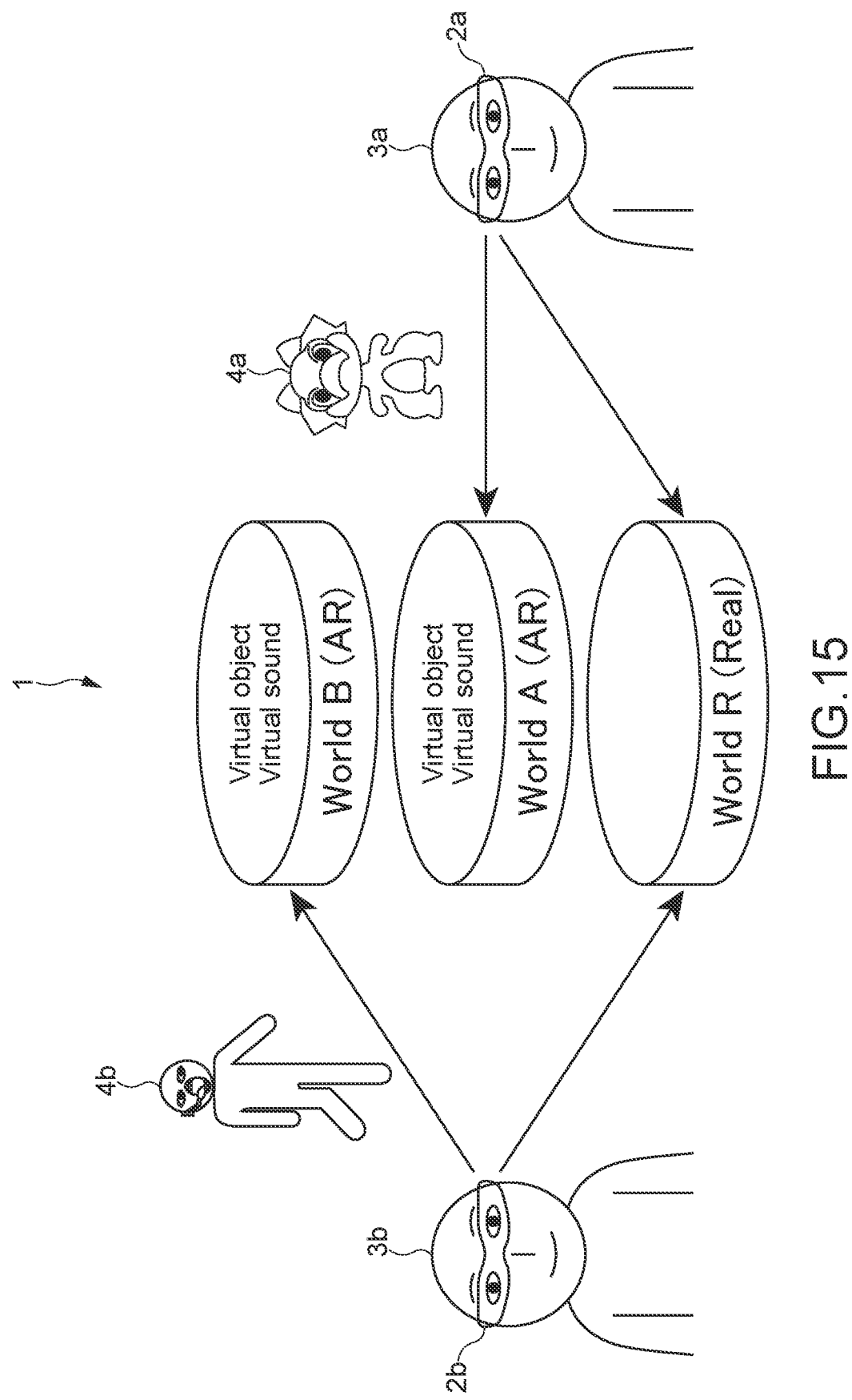
FIG. 15 A schematic diagram for outlining an AR providing system according to a second embodiment.

FIG. 15 is a schematic diagram for outlining an AR providing system according to the second embodiment.

The AR providing system 1 according to the present embodiment is effective in a situation where a plurality of users 3 respectively wears HMDs 2 and enjoys different AR worlds. That is, this AR providing system 1 functions for the plurality of HMDs 2.

Hereinafter, the description will be given taking two HMDs 2a and 2b as an example as shown in FIG. 15.

As shown in FIG. 15, an AR space (World A) is created for the user 3a wearing the HMD 2a, based on a real world (World R). For example, an AR world where cute monsters are active in a city of the real world as virtual objects 4a is created.

Any sounds including voices of characters such as monsters, a siren sound, a door close sound effect, and the like may be output as the virtual sounds.

An AR space (World B) is created for the user 3b wearing the HMD 2b is created based on the real world (World R). For example, an AR world where singing and dancing dancers are active in a city of the real world as virtual objects 4b is created.

Any sounds including singing voices of the dancers, sounds of stepping on the ground, a background music, and the like may be output as the virtual sounds.

The user 3a cannot visually recognize the virtual objects 4 (dancers) of the AR space (World B). The user 3a also cannot hear the virtual sounds generated in the AR space (World B).

Similarly, the user 3b cannot visually recognize the virtual objects 4 (monsters) of the AR space (World A). The user 3b also cannot hear the virtual sounds generated in the AR space (World A).

As a matter of course, not only the monsters and dancers, but also various virtual objects 4 constituting each AR space are displayed only to the user 3 who experiences the AR space.

The HMDs 2a and 2b are connected to be capable of communicating with each other. A communication form for connecting the plurality of HMDs 2 to be capable of communicating with each other is not limited. Any communication the technology may be used. For example, wireless network communication such as WiFi, near-field communication such as Bluetooth (registered trademark), or the like can be used.

The HMDs 2a and 2b may be capable of communicating with each other via a server in a network or the like.

For example, the technology described in the first embodiment may be applied to each of the HMDs 2a and 2b. That is, in a case where the users 3a and 3b are located adjacent to each other, for example, each of the HMDs 2a and 2b may execute reproduction control of the virtual content based on the avoidance region information. Also in this case, a high-quality AR experience can be achieved.

On the other hand, in the present embodiment, the HMD 2a and the HMD 2b exchange (send/receive) various types of information such as avoidance region information and priorities.

Specifically, each of the HMD 2a and the HMD 2b generates avoidance region information for the other user 3 (for the other HMD 2). That is, the HMD 2 can generate by itself avoidance region information used for the counterpart HMD 2 to execute reproduction control based on the avoidance region information and send it to the counterpart. This enables the HMD 2 to generate useful avoidance region information as appropriate, which does not affect the world view of the its own AR world, and pass it to the counterpart.

Moreover, in the present embodiment, each of the HMD 2a and the HMD 2b calculates a priority for reproduction of the virtual content based on the avoidance region information. Then, each of the HMD 2a and the HMD 2b sends the generated priority to the counterpart.

Two priorities respectively calculated by the HMD 2a and the HMD 2b are compared. Then, the HMD 2 having a higher priority executes normal reproduction control without executing reproduction control based on the avoidance region information. Accordingly, a normal AR world is achieved.

The HMD 2 having a lower priority executes reproduction control of the virtual content on the basis of the avoidance region information received from the counterpart. As described in the first embodiment, the virtual content can be reproduced so as not to affect the world view of the AR world.

As a result, a situation where the interference with the other user 3 or the like affects the world view of the AR world to both the users 3a and 3b can be avoided, and a high-quality AR experience can be achieved.

In the present embodiment, each of the plurality of HMDs 2 can function as an embodiment of the information processing apparatus according to the present technology. Moreover, each of the plurality of HMDs 2 can function as an embodiment of another information processing apparatus according to the present technology.

Hereinafter, a description will be given assuming that the HMD 2a shown in FIG. 15 is the embodiment of the information processing apparatus according to the present technology and the HMD 2b is the embodiment of the other information processing apparatus according to the present technology.

Therefore, the user 3a wearing the HMD 2a is a target person who is a target to whom virtual content is reproduced. The virtual content (virtual object 4a or virtual sound) that the HMD 2a reproduces to the user 3a is the virtual content for the target person (virtual object 4a or virtual sound).

The HMD 2b is the embodiment of the other information processing apparatus.

The user 3b wearing the HMD 2b is the other object. Moreover, the user 3b wearing the HMD 2b is another target person who is a target to whom the other information processing apparatus reproduces the virtual content.

The virtual content (virtual object 4b or virtual sound) that the HMD 2b reproduces to the user 3b is the virtual content (virtual object 4a or virtual sound) for the other object (for the other target person).

As a matter of course, the technology described hereinafter can be applied as it is, also assuming that the HMD 2b is the embodiment of the information processing apparatus according to the present technology and the HMD 2a is the embodiment of the other information processing apparatus according to the present technology.

Figure 16:
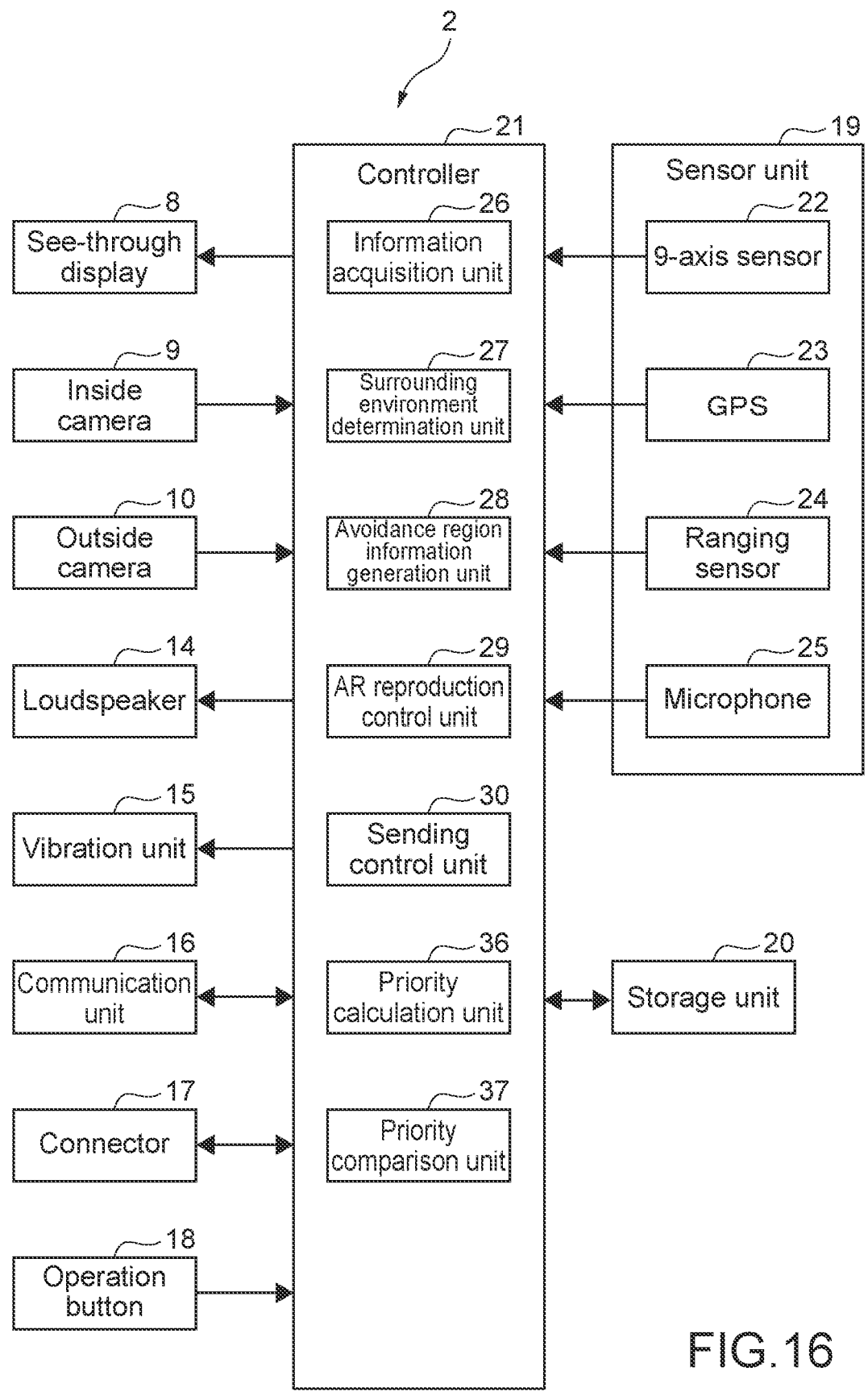
FIG. 16 A block diagram showing a functional configuration example of an HMD.

FIG. 16 is a block diagram showing a functional configuration example of the HMDs 2a and 2b.

In the present embodiment, the controller 21 further controls a priority calculation unit 36 and a priority comparison unit 37.

The priority calculation unit 36 calculates a priority for reproduction of the virtual content based on the avoidance region information.

The priority comparison unit 37 compares a priority generated by itself with a priority of the other HMD 2 received from the counterpart HMD 2.

In the present embodiment, the counterpart HMD 3 generates avoidance region information to be used by itself. Then, the information acquisition unit 26 acquires the generated avoidance region information via the communication unit 16. Therefore, in the present embodiment, the information acquisition unit 26 is an embodiment of the acquisition unit according to the present technology.

The avoidance region information generation unit 28 functions as an embodiment of the generation unit according to the present technology.

The AR reproduction control unit 29 corresponds to an embodiment of the reproduction control unit according to the present technology.

The priority calculation unit 36 corresponds to an embodiment of the priority calculation unit according to the present technology.

The sending control unit 30 corresponds to an embodiment of the sending control unit according to the present technology.

[Reproduction Operation of Virtual Content]

Figure 17:
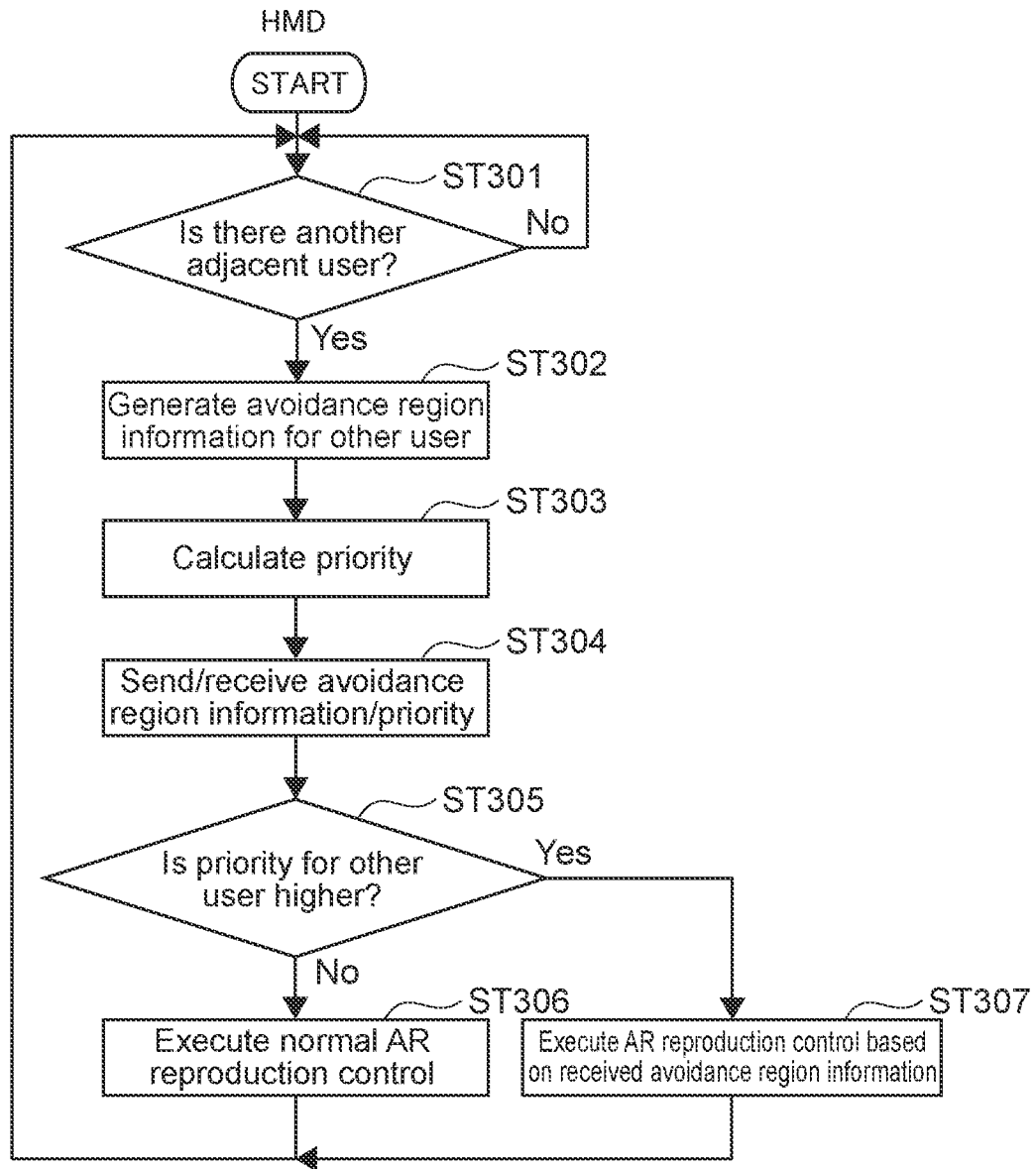
FIG. 17 A flowchart showing a reproduction operation example of virtual content by the HMD.

FIG. 17 is a flowchart showing an operation example of reproduction of the virtual content by the HMDs 2a and 2b. Here, the description will be given assuming the HMD 2a as a subject.

FIGS. 18 to 28 are schematic diagrams for describing each of steps shown in FIG. 17.

In the present embodiment, the processing shown in FIG. 4 is executed at a predetermined frame rate for achieving an AR space. As a matter of course, the present technology is not limited to the case where the processing is executed on a frame-by-frame basis.

The surrounding environment determination unit 27 monitors whether or not there is another adjacent user 3 (Step 301).

In a case where for example processing similar to Steps 201 and 202 shown in FIG. 5 is executed and there is an adjacent object (Yes in Step 202), whether or not the object is the other user 3 may be determined.

The other user 3 corresponds to the user 3 wearing the HMD 2 (other information processing apparatus) that can function as an element of the AR providing system 1 according to the present technology.

For example, a signal or the like for inquiring whether it can function as the element of the AR providing system 1 according to the present technology (e.g., whether or not it includes the functional blocks as shown in FIG. 16) is sent. Then, it is determined that there is another adjacent user 3 in a case of receiving a positive response signal.

In addition, any method that allows checking whether or not the adjacent object is the other user 3 may be employed.

For example, in a case of Yes in Step 202 shown in FIG. 5, the processing shifts to Step 301 shown in FIG. 17. In a case of No in Step 301, the processing shifts to Step 204 in FIG. 5. In a case of Yes in Step 301, the processing shifts to Step 302 shown in FIG. 17. Such a processing flow may be employed. This allows processing combining the processing flow shown in FIG. 5 and the processing flow shown in FIG. 17.

Alternatively, the HMD 2 may regularly send a device search signal, an inquiry signal, or the like by broadband. Then, it may be determined that there is another adjacent user 3 when receiving a response signal from the other HMD 2.

Moreover, the other HMD 2 may regularly output a beacon signal or the like including information indicating that it can function as an element of the AR providing system 1 according to the present technology. It may be determined that there is another adjacent user 3 when receiving the beacon signal.

In addition, any method and algorithm may be employed for the determination in Step 301.

For example, adding the determination step as to whether or not the adjacent object is the user 3 to the processing flow shown in FIG. 5, a processing flow to return to Step 201 in a case where the adjacent object is the other user 3 is configured. Such a processing flow and the processing flow shown in FIG. 17 may be executed in parallel. This allows processing combining the processing flow shown in FIG. 5 and the processing flow shown in FIG. 17.

Figure 18:
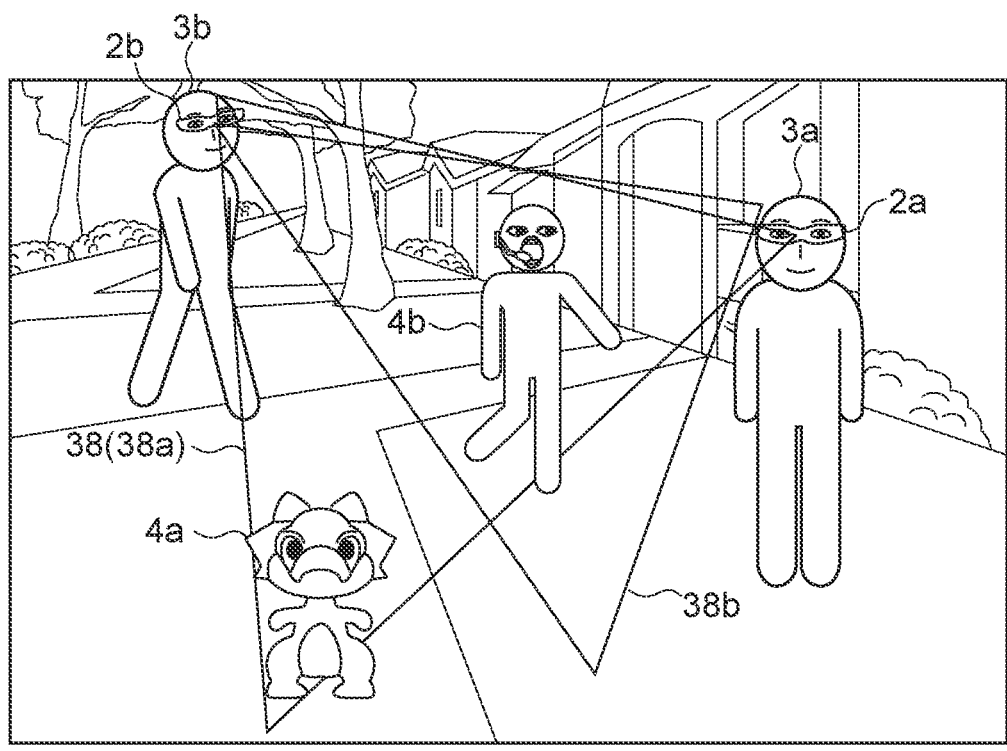
FIG. 18 A schematic diagram for describing a determination example of another adjacent user.

As shown in FIG. 18, the area of the effective field of view (angle of view) may be used as a parameter that is a determination criteria for Step 301.

In a case where the users 3a and 3b have both entered effective fields of view 38 (38a and 38b) or at least one of the users 3 has both entered the counterpart effective fields of view 38, it may be determined that there is an adjacent user 3.

As shown in FIG. 18, the virtual objects 4a and 4b are often located in the effective fields of view 38a and 38b, and its virtual object 4 interferes with the counterpart user 3 with a higher possibility. Thus, the use of the effective field of view as the parameter that is the determination criteria for Step 301 can sufficiently cope with such interference.

Determination using the effective fields of view can be executed by, for example, the HMDs 2a and 2b exchanging their position information, orientation information, and effective field of view information. Moreover, the sensor information and the like of the outside camera 10 and the ranging sensor 24 may be used for determining that the counterpart is located in the effective field of view.

Moreover, a distance to the user 3b may be used as the parameter that is the determination criteria for Step 301. Interference occurs with a higher possibility for example in a case where the subject user (user 3a) is close to the counterpart (user 3b). It may be determined that there is an adjacent user 3 for example in a case where the distance between the subject user (user 3a) and the counterpart (user 3b) is 20 m or less.

For example, a distance to the other user 3 can be detected on the basis of the sensor information of the ranging sensor 24.

Alternatively, determination based on the distance between the users 3 can be executed by exchanging the position information acquired by the GPS 23, the position information calculated by the self-position estimation, or the like.

As a matter of course, a specific distance may be arbitrarily set. Depending on the contents of the AR application, a distance of several kilometers other than a distance where the users 3 can see each other may be employed as determination criteria.

Moreover, a distance between the virtual object 4a for the subject user (user 3a) and the counterpart (user 3b) or a distance between the virtual objects 4a and 4b may be used as the parameter that is the determination criteria for Step 301.

In a case where these distances are short, the interference occurs with a higher possibility. For example, in a case where the distance between the virtual object 4a for the subject user (user 3a) and the counterpart (user 3b) is 10 or less, it is determined that there is an adjacent user 3.

Alternatively, it is determined that there is an adjacent user 3 in a case where the distance between the virtual objects 4a and 4b is 10 m or less.

As a matter of course, a specific distance may be arbitrarily set.

Such a determination can be executed on the basis of, for example, position information of each user 3 and display position information of each virtual object 4.

In a case where there is another adjacent user 3 (Yes in Step 301), the avoidance region information generation unit 28 generates avoidance region information for the other user 3b (Step 302).

The avoidance region information generation unit 28 can generate the avoidance region information for the other user 3b, for example, on the basis of the position of the subject user (user 3a). For example, the avoidance region 33 shown in FIGS. 7 to 9 is set, replacing the other person 32 by the subject user (user 3a). That is, the avoidance region for the other user 3b is set on the basis of orientation and motion (vector), using the position of the subject user (user 3a) as a basis. The avoidance region information including the avoidance region is generated as the avoidance region information for the other user 3b.

Figure 19:
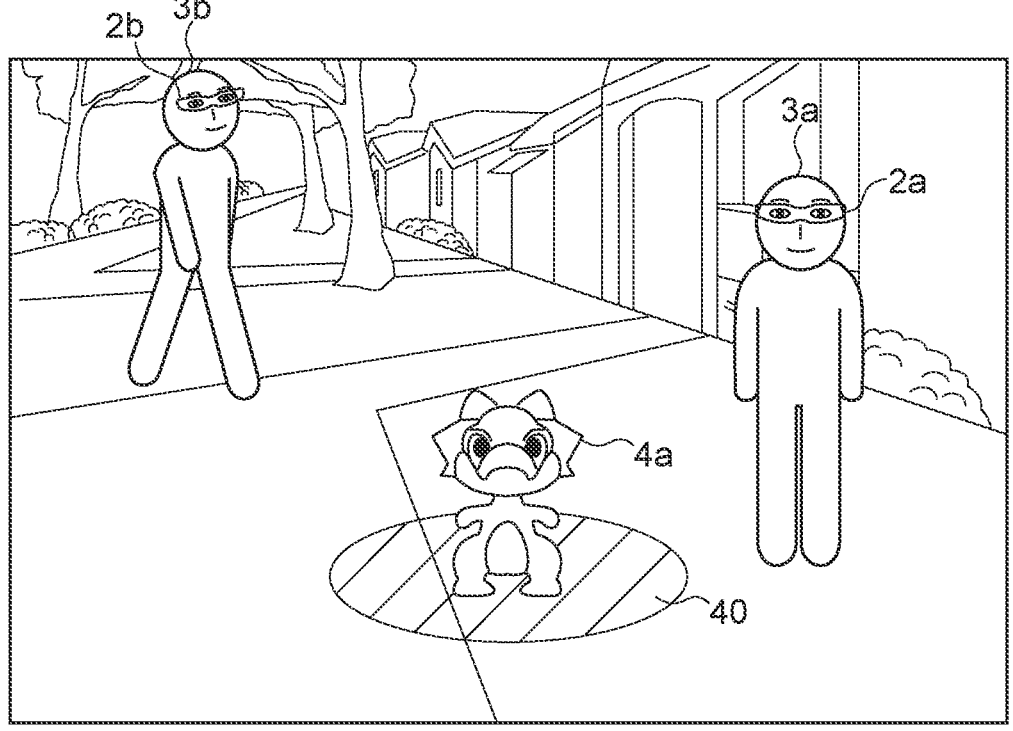
FIG. 19 A schematic diagram showing a setting example of an avoidance region for the other user.
Figure 20:
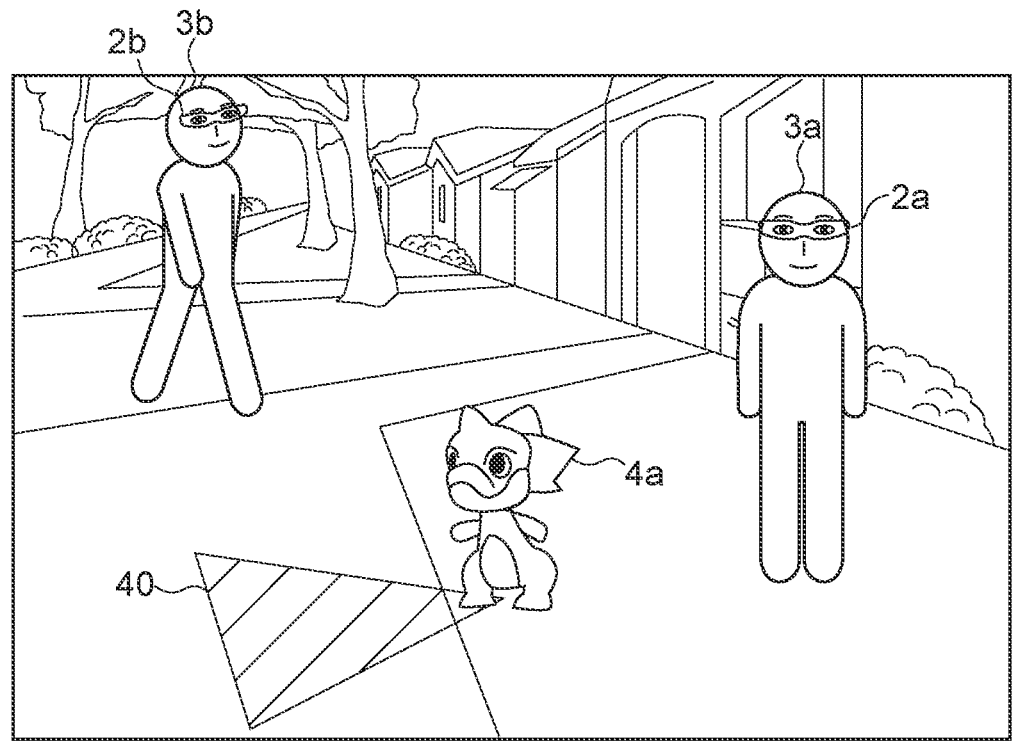
FIG. 20 A schematic diagram showing a setting example of the avoidance region for the other user.
Figure 21:
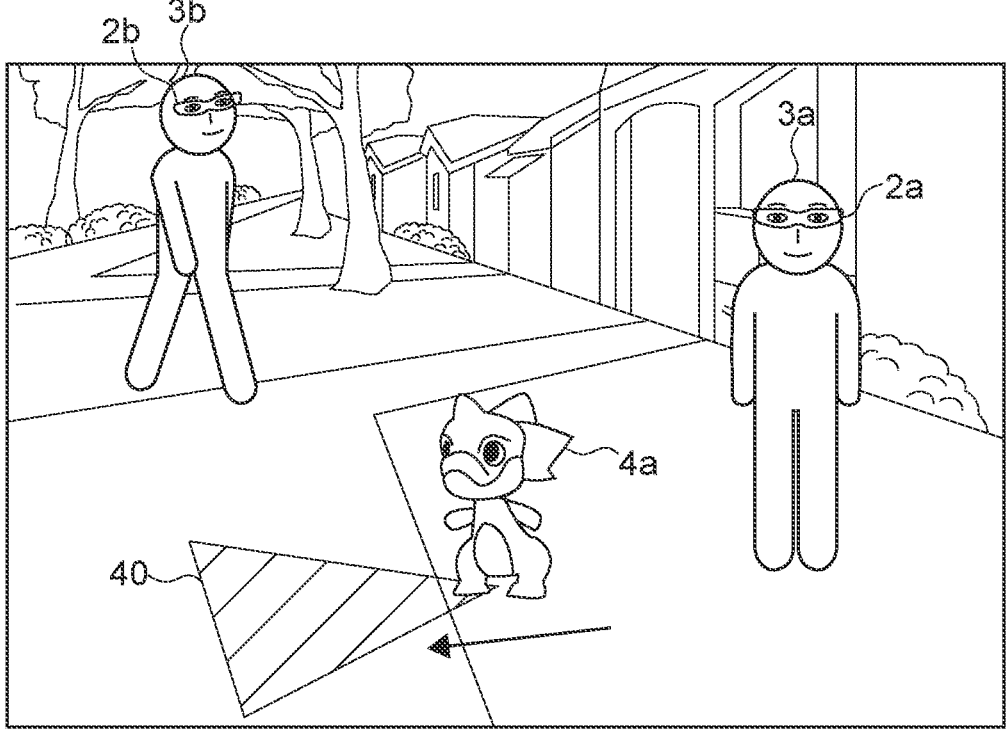
FIG. 21 A schematic diagram showing a setting example of the avoidance region for the other user.

As shown in FIGS. 19 to 21, the avoidance region information for the other user 3b may be generated on the basis of the position of the virtual object 4a for the subject user (user 3a).

In FIGS. 19 to 21, a region of a predetermined range based on the position (e.g., display position) of the virtual object 4a for the subject user (user 3a) is set as an avoidance region 40 for the other user 3b.

When the counterpart (user 3b) passes around the virtual object 4a for the subject user (user 3a) or the virtual object 4b for the counterpart (user 3b) comes around the virtual object 4a for the subject user (user 3a), the counterpart (user 3b) also comes close to there. In view of this, the periphery of the virtual object 4a for the subject user (user 3a) is set as the avoidance region 40.

In the example shown in FIG. 19, a circular region having a predetermined length centered at the virtual object 4a for the subject user (user 3a) as a radius is set as the avoidance region 40. As a matter of course, the shape of the avoidance region 40 is not limited. The avoidance region 40 may be elliptical or polygonal.

Moreover, the size of the avoidance region 40 is also not limited. For example, any numeric value, e.g., a radius of 3 m may be set.

In FIG. 20, the avoidance region 40 is set using the orientation of the virtual object 4a for the subject user (user 3a) as a parameter. The avoidance region 40 is set on the basis of the orientation because the virtual object 4a often moves in a direction that it faces.

An avoidance region 40 having a predetermined shape, e.g., a triangular, rectangular, circular, elliptical, or polygonal shape is set in front of the virtual object 4a for the subject user (user 3a) in the direction that the virtual object 4a for the subject user (user 3a) faces.

In a case of using the avoidance region 40 that is the isosceles triangle as shown in FIG. 20, the apex of the isosceles triangle is adjusted to the position of the virtual object 4a for the subject user (user 3a). Then, a normal extending to the base from the apex angle of the isosceles triangle is adjusted to the direction/orientation of the virtual object 4a for the subject user (user 3a).

In addition, any setting method reflecting the orientation of the virtual object 4a for the subject user (user 3a) may be employed.

In FIG. 21, a motion of the virtual object 4a for the subject user (user 3a) is used as a parameter. Specifically, a motion vector representing a movement direction (orientation) of the virtual object 4a for the subject user (user 3a) and movement velocity are calculated. The avoidance region 40 is set on the basis of the motion vector.

It should be noted that how the virtual object 4a for the subject user (user 3a) moves can be acquired from the contents of the AR application. For example, in a case where the motion of the virtual object 4a is fixed in accordance with a program, the avoidance region 40 can be easily generated on the basis of the motion of the virtual object 4a.

An avoidance region 40 having a predetermined shape, e.g., a triangular, rectangular, circular, elliptical, or polygonal shape is set in front of the virtual object 4a for the subject user (user 3a) in the direction of the motion vector. The size of the avoidance region 40 may be adjusted as appropriate in accordance with the magnitude of the motion vector.

As shown in FIG. 21, in a case of using the avoidance region 40 that is the isosceles triangle, the apex of the isosceles triangle is adjusted to the position of the virtual object 4a for the subject user (user 3a). Then, a normal extending to the base from the apex angle of the isosceles triangle is adjusted to the direction of the motion vector. Moreover, the avoidance region 40 constituted by the isosceles triangle may be set so that the magnitude of the normal equals the magnitude of the motion vector.

In this manner, the avoidance region information may be generated on the basis of the motion of the virtual object 4a for the subject user (user 3a). The motion prediction allows highly accurate setting of the avoidance region 40.

The avoidance region 40 is set on the basis of, for example, the three-dimensional coordinates defined by the surrounding environment determination unit 27.

A stereoscopic region may be set as the avoidance region 40. For example, a conical or square pyramid shape extending on the front side of the virtual object 4a for the subject user (user 3a), for example, using the position of the virtual object 4a for the subject user (user 3a) as the apex, may be set as the avoidance region 40.

It should be noted that it is assumed that information about the position and the like of the virtual object 4 for the other user 3 can be acquired in a case where the adjacent object is the other user 3 in the first embodiment. In this case, the avoidance region information may be generated on the basis of the position or motion of the virtual object 4 for the other user 3 in Step 204 shown in FIG. 5.

For example, avoidance region information including an avoidance region 33 set as in the avoidance region 40 illustrated in FIGS. 19 to 21 or the like may be generated.

Figure 22:
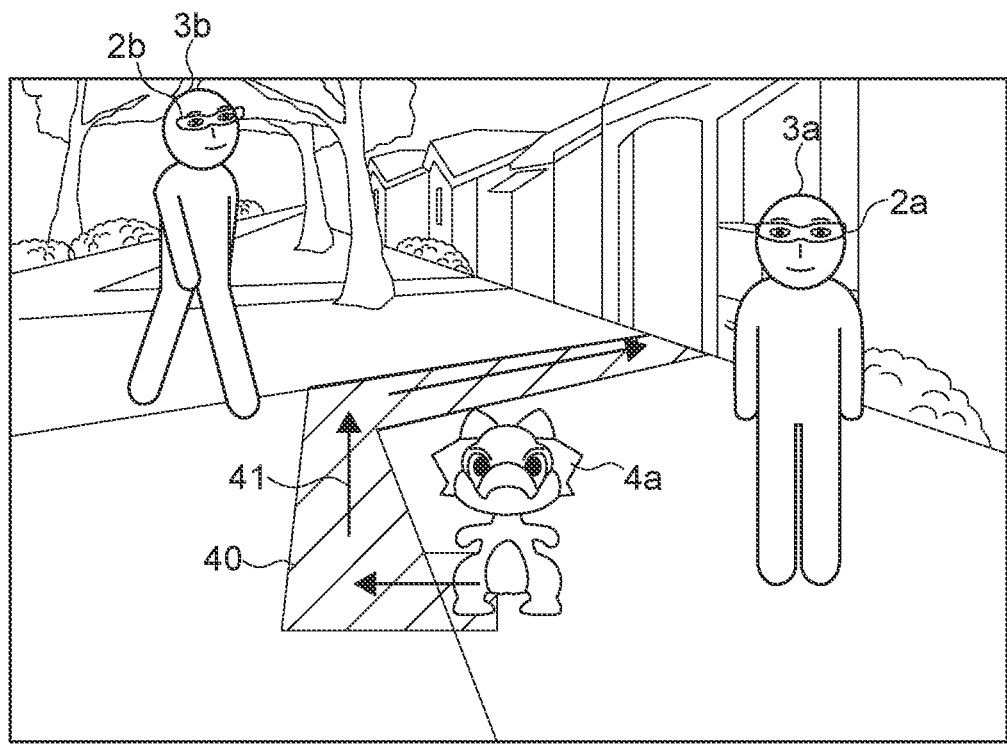
FIG. 22 A schematic diagram showing a setting example of the avoidance region for the other user.

The avoidance region 40 can also be set on the basis of a direction (path 41) in which the virtual object 4a for the subject user (user 3a) moves as shown in FIG. 22.

For example, in a case where the path 41 of the virtual object 4a is fixed in accordance with a program, the avoidance region 40 can be easily generated on the basis of the path.

The width of the avoidance region 40 is arbitrarily set on the basis of the width or the like of the virtual object 4a, for example. The avoidance region 40 is set to have the set width along the path 41.

For example, in a case where a width w of the virtual object 4a is 10 cm, the width of the avoidance region 40 is 3 w=30 cm. As a matter of course, the present technology is not limited to such a setting.

Figure 23:
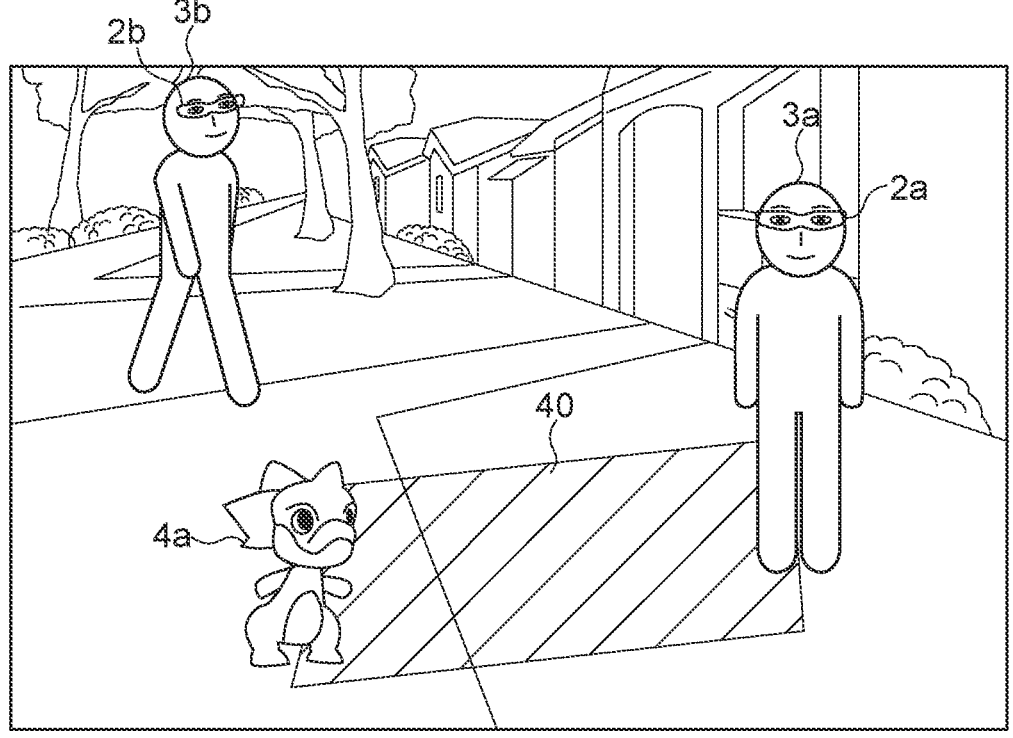
FIG. 23 A schematic diagram showing a setting example of the avoidance region for the other user.

As shown in FIG. 23, a region between the virtual object 4a for the subject user (user 3a) and the subject user (user a) may be set as the avoidance region 40.

The user 3 moves toward the virtual object 4 displayed to the subject user with a higher possibility. Therefore, the region between them is set as the avoidance region 40.

For example, the virtual object 4a for the subject user (user 3a) and the subject user (user a) are connected with a thick line with a predetermined width (e.g., 60 cm), and the region of this line is set to the avoidance region 40. As a matter of course, the present technology is not limited to such a setting, and an avoidance region 40 having a predetermined shape, e.g., a circular, elliptical, or polygonal shape may be set.

Figure 24:
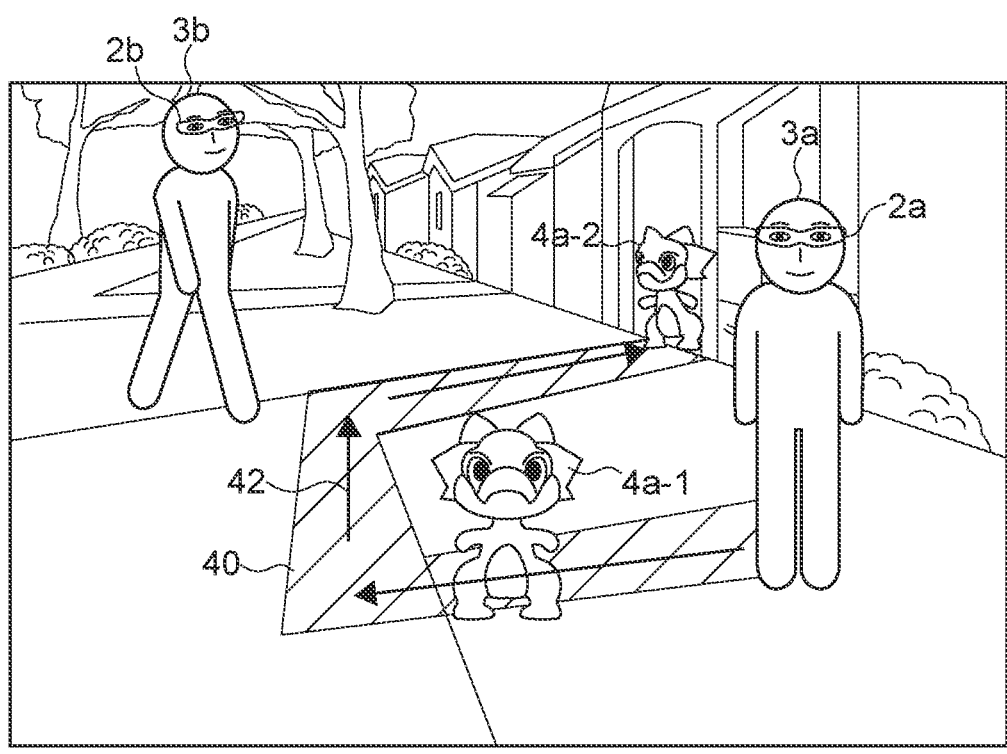
FIG. 24 A schematic diagram showing a setting example of the avoidance region for the other user.

An avoidance region 40 may be set on the basis of a direction (path 42) in which the user 3a moves as shown in FIG. 24.

The path 42 in the user 3a moves is predicted in the AR world. That route is set as the avoidance region 40.

In the example shown in FIG. 24, it is assumed that the contents of the AR application are, for example, contents to listen to a story of a virtual object 4a-1 and tell it to a virtual object 4a-2.

The HMD 2a predicts the path 42 to approach the virtual object 4a-1 and approach the virtual object 4a-2 along the road. Then, a region having a predetermined width along the path 42 is set as the avoidance region 40.

Not limited to the path 42 to a very close place as shown in FIG. 24, the avoidance region 40 can be set along the path 42 of several kilometers, depending on the contents of the AR application.

In the first embodiment, avoidance region information including the avoidance region 33 set as in the avoidance region 40 illustrated in FIGS. 22 to 24 or the like may be generated.

Referring back to FIG. 17, the priority calculation unit 36 calculates a priority (Step 303).

The priority is information for determining whether to execute reproduction of the virtual content on the basis of the avoidance region information received from the counterpart or normal reproduction of the virtual content.

This processing is executed for each frame or executed by 1 degree when finding the other user 3b.

Hereinafter, priority calculation examples will be described. The respective calculation examples may be combined as appropriate.

An application/person for which a place has been reserved is prioritized. For example, the information about the priority is managed in the AR providing system 1 and the priority is determined in accordance with a reservation status of the place.

For example, in a case where a famous scramble crosspoint is lent to a single AR application at 18-19 o'clock, a predetermined priority (e.g., determined with scores of 0 to 100) is set to the user 3 participating in the AR application.

For example, a higher priority is set to a user of the reserved AR application in the reserved place. This can preferentially achieve an AR world relating to the reserved AR application so as to keep the world view in that place. That is, normal reproduction of the virtual content is preferentially executed. As a matter of course, a higher priority may be set in accordance with a reserved time zone.

An application/person used by a larger number of users by multiplay is prioritized. That is, the priority is set to be higher as the number of participant users who experience the same AR world increases.

For example, in a case where the number of users 3 participating in the AR space (World A) shown in FIG. 15 is 10, 10 is set as a priority for each user 3. In a case where the number of users 3 participating in the AR space (World B) is 5, 5 is set as the priority for each user 3. In this way, the number of participants may be used as the priority as it is.

This can preferentially achieve an AR world with a larger number of participants so as to keep the world view.

The priority may be set on the basis of microtransaction information performed for experiencing the AR world. For example, a user 3 using microtransactions or a user 3 who has paid more money for microtransactions is prioritized. For example, the priority can be set in accordance with the amount of microtransactions.

This can preferentially achieve an AR world that the user 3 using microtransactions or the user 3 who has paid more money for microtransactions is enjoying so as to keep the world view.

The priority may be set on the basis of movement velocity of the user 3 or virtual object 4.

For example, in a case where the user 3 who has stopped can more flexibly change the motion than the user 3 walking, a setting is made considering that the priority equals the velocity of the user 3 or virtual object 4. This can preferentially achieve an AR world for the user 3 or virtual object 4 moving at a higher speed so as to keep the world view.

A higher priority may be set to the user 3 or virtual object 4 that has stopped on the contrary. For example, a setting that the priority equals 1 divided by the velocity of the user 3 or virtual object 4 may be made.

A speaking user 3 is prioritized.

When the user 3 is speaking, the user 3 can feel more discomfort in comparison with avoidance using only a visual means. Therefore, a higher priority is set to the speaking user 3. For example, the priority equals a speaking time duration.

This can preferentially achieve an AR world for the speaking user 3 so as to keep the world view.

The priority may be set on the basis of a degree of interest in the virtual object 4.

The priority is set based on whether the user 3 is interested in the virtual object 4 in the AR world. In a case where the user 3 is not interested in the virtual object 4, even changing a display method for the virtual object 4 causes no discomfort. For example, a setting that the priority equals 1 divided by a distance between a gazing point and the virtual object 4 can be made.

It should be noted that the gazing point of the user 3 can be detected based on, for example, images of the left and right eyes of the user 3 captured by the inside camera 9.

The sending control unit 30 sends, to the HMD 2b, avoidance region information for the other user 3b and a priority for the subject user (user 3a) (Step 304).

Moreover, the sending control unit 30 receives, from the HMD 2b, avoidance region information for the other user (i.e., user 3a) as viewed from the HMD 2b and a priority for the user 3b (also, Step 304).

The information acquisition unit 26 acquires the avoidance region information and the priority received from the HMD 2b and outputs to each block of the controller 21.

The priority comparison unit 37 compares the priorities and determines whether or not the priority for the other user 3b is higher (Step 305).

In a case where the priority for the other user 3b is lower, i.e., the priority for the subject user (user 3a) is higher (No in Step 305), the AR reproduction control unit 29 executes normal reproduction control of the virtual content (Step 306). That is, the AR reproduction control unit 29 does not execute reproduction control of the virtual content based on the avoidance region information received from the HMD 2b.

In a case where the priority for the other user 3b is higher, i.e., the priority for the subject user (user 3a) is lower (Yes in Step 305), the AR reproduction control unit 29 executes reproduction control of the virtual content on the basis of the avoidance region information received from the HMD 2b (Step 307).

The AR reproduction control unit 29 executes reproduction of the virtual content for avoiding the entrance of the virtual object 4a for the user 3a to the avoidance region as described above with reference to FIGS. 10 and 11, for example. That is, the AR reproduction control unit 29 executes reproduction control to prevent the virtual object 4a from entering the avoidance region 33.

Alternatively, the AR reproduction control unit 29 may execute reproduction of the virtual content for avoiding the entrance of the user 3a to the avoidance region as described above with reference to FIGS. 12 to 14. That is, the AR reproduction control unit 29 may execute reproduction control to prevent the user 3a from entering the avoidance region.

The AR reproduction control unit 29 may execute various other reproduction control using the avoidance region as a basis so as not to affect the world view of the AR space.

Moreover, for example, in a case where a plurality of users 3 participates in an AR application having a lower priority, the AR reproduction control unit 29 may execute reproduction control different from each other on the respective users 3. Alternatively, the AR reproduction control unit 29 may execute common reproduction control on the respective users 3.

FIGS. 25 to 28 are schematic diagrams for describing another example of the reproduction control of the virtual content.

With respect to the avoidance region included in the avoidance region information 40 received from the HMD 2b, it may be difficult to avoid the entrance of the subject user (user 3a) or the entrance of the virtual object 4a for the subject user (user 3a).

Figure 25:
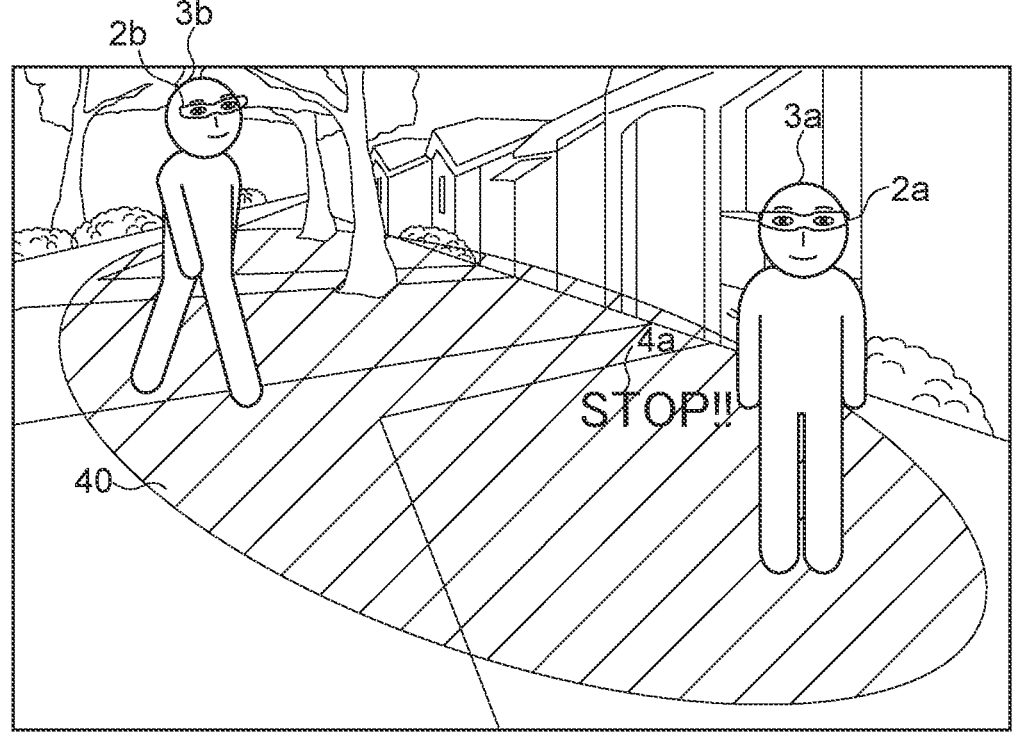
FIG. 25 A schematic diagram showing a reproduction control example of the virtual content.
Figure 26:
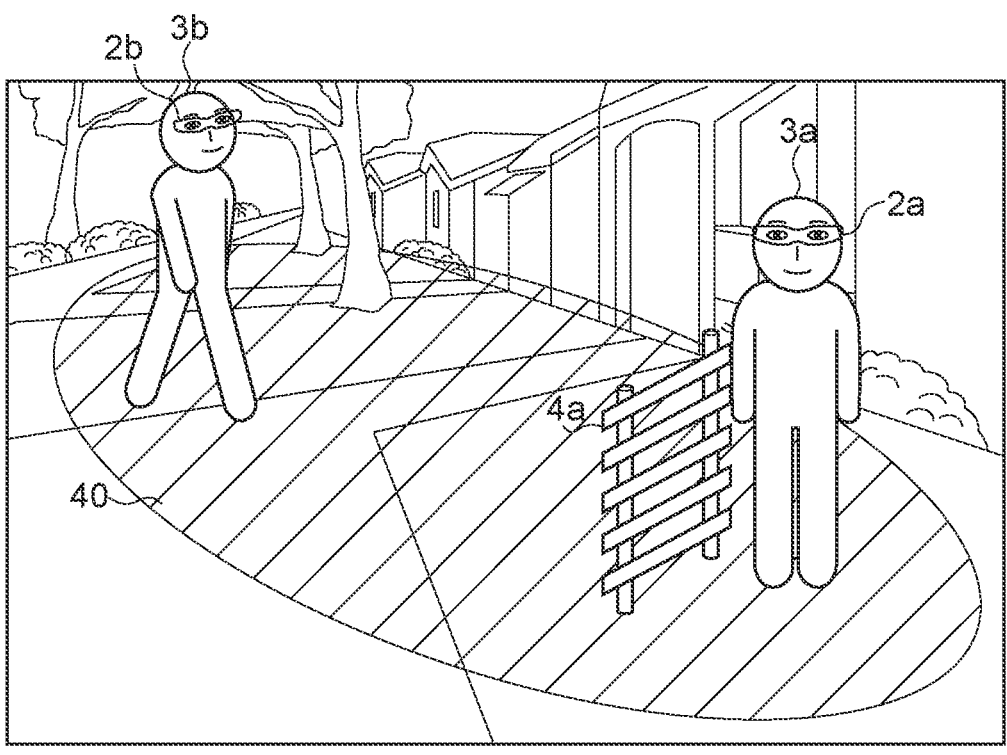
FIG. 26 A schematic diagram showing a reproduction control example of the virtual content.
Figure 27:
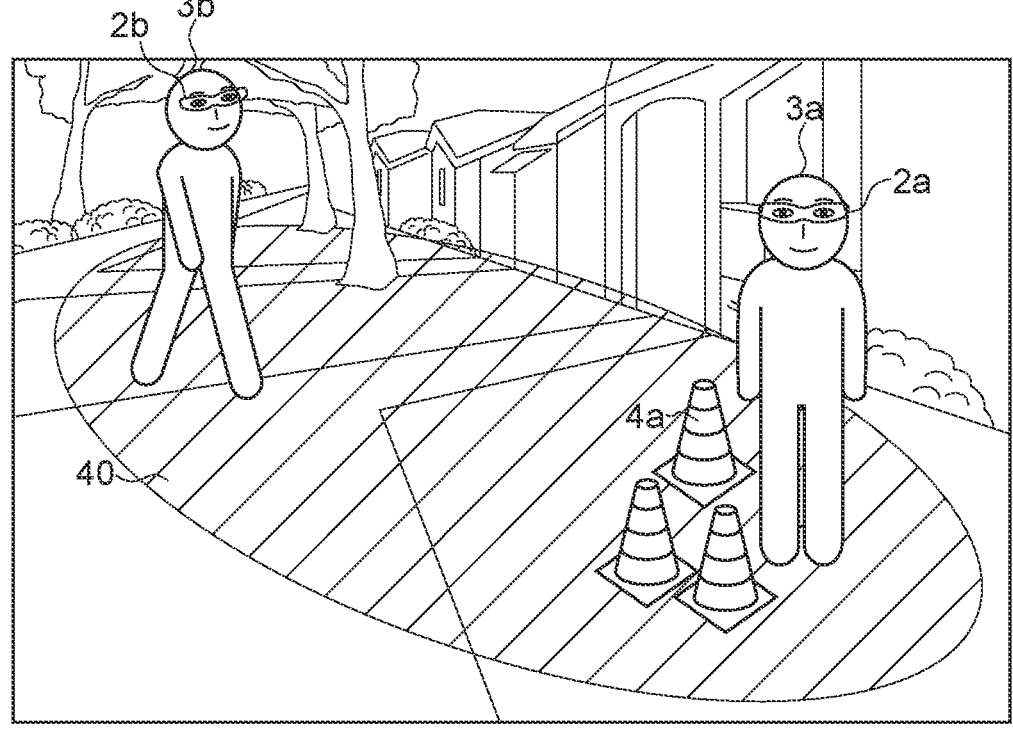
FIG. 27 A schematic diagram showing a reproduction control example of the virtual content.

For example, as shown in FIGS. 25 to 27, the avoidance region 40 can be a significant large or the avoidance can be difficult due to an environment where the user 3a is located (e.g., a too narrow path). In addition, data about the avoidance region 40 of the received avoidance region information can be damaged, for example.

In such a case, for example, a general-purpose virtual object 4 to stop the motion of the user 3a may be displayed as an emergency case.

The general-purpose virtual object 4 is one virtually displaying a general-purpose image or object that allows the user 3 to recognize that he or she should stop the motion, although it can mismatch the world view of the AR world.

For example, as shown in FIG. 25, the text image (words), "STOP!!", is displayed as the virtual object 4a. The virtual sound, "STOP!!", may be output.

Directly presenting the virtual object 4a with words makes the user 3a follow the instruction in many cases.

In the example shown in FIG. 26, a fence image is displayed as a virtual object 4a.

In the example shown in FIG. 27, triangle cone images are displayed as virtual objects 4a.

In addition, any object that allows recognition that it is impossible to advance in the real world, such as a tape having the phrase, "Keep Out", may be displayed.

The use of the general-purpose virtual object 4 as illustrated in FIGS. 25 to 27 can reliably stop the user 3a.

Moreover, in the example shown in FIGS. 25 to 27, the general-purpose virtual object 4 is displayed at a position too close to the user 3a. In this manner, the display position of the general-purpose virtual object 4 may be set in accordance with the position of the user 3a.

On the other hand, the general-purpose virtual object 4 may be fixedly displayed at a predetermined position with respect to the real world or a predetermined position on the see-through display 8. Moreover, alert display or alert sound may be output.

Regarding a character such as a monster, an expression to cancel the state of having entered the avoidance region 40, for example, an expression that it flies far away at a time or an expression that it disappears gradually may be employed.

Figure 28:
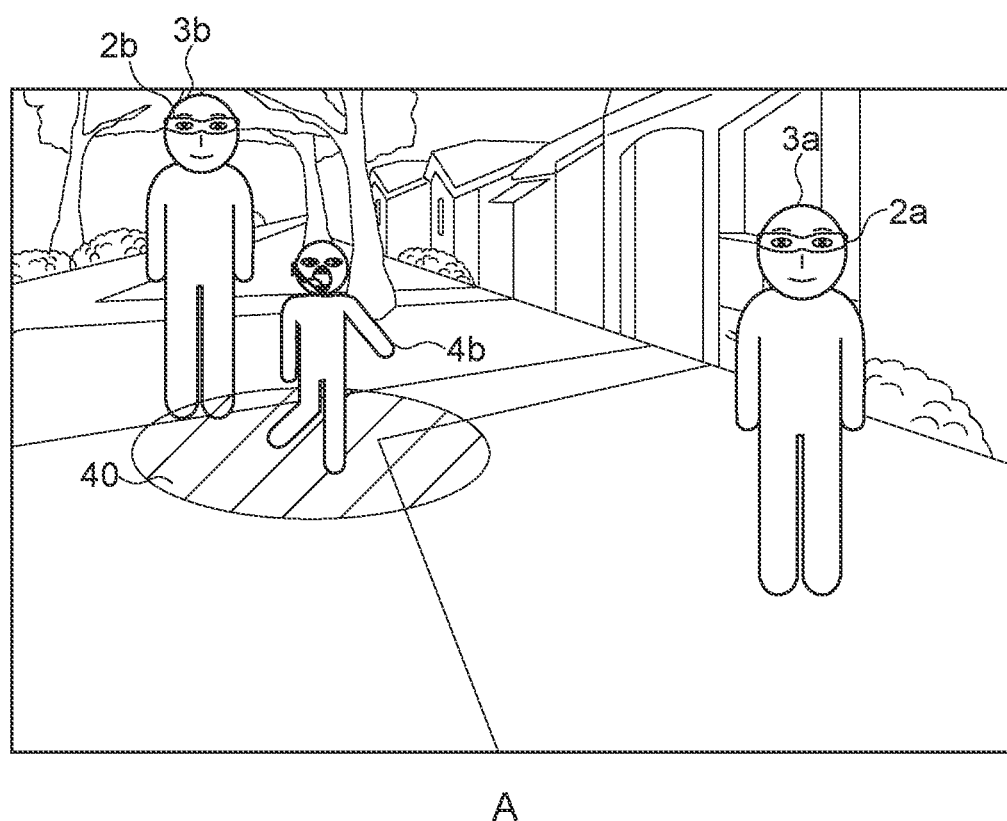
FIG. 28 A schematic diagram showing a reproduction control example of the virtual content.
Figure 28:
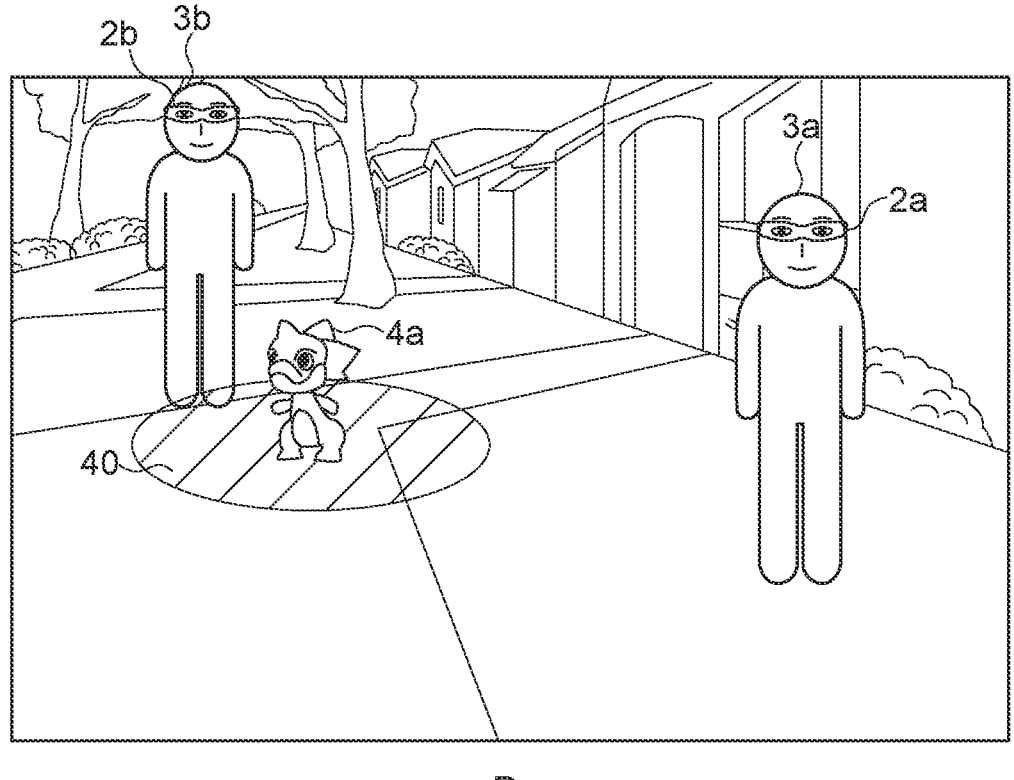

As shown in FIG. 28, conversion (alternative) of the virtual object 4 may be executed.

It is assumed that the other user 3b has stopped and is talking with the virtual object 4b (dancer) for the other user 3b as shown in FIG. 28 A.

The periphery of the virtual object 4b becomes the avoidance region 40 for the user 3a having a lower priority, such that the user 3a and the virtual object 4a for the user 3a cannot approach it.

On the other hand, the user 3a cannot visually recognize the virtual object 4b for the other user 3b and cannot understand why the user 3b is talking alone. Moreover, the user 3a also cannot understand the avoidance region 40 at the periphery of the virtual object 4b for the other user 3b.

In such a situation, as shown in FIG. 28 B, the virtual object 4a (monster) for the user 3a is displayed at the same position in place of the virtual object 4b (dancer) for the other user 3b. Then, an expression of talking to the user 3b is employed. For example, a talking voice of the monster may be output as the virtual sound.

Thus displaying the virtual object 4a appropriate for the world view of the AR world of the subject user instead enables the user 3a to understand why the user 3b is talking. Moreover, it can also prevent the user 3a from approaching the periphery of the virtual object 4a with which the user 3b is talking.

It should be noted that an expression enabling the user 3a to recognize that it is the virtual object 4 displayed instead of the virtual object 4b for the other user 3b may be presented.

Other Embodiments

The present technology is not limited to the above-mentioned embodiments, and various other embodiments can be achieved.

FIGS. 29 to 34 are schematic diagrams for describing setting of avoidance requirement levels.

Avoidance requirement levels may be set to the avoidance region 33 and the avoidance region 40 set for the other user 3b.

The avoidance requirement level information indicating how much avoidance is required and can also be said to be an avoidance level. Avoidance is required at a higher level as the avoidance requirement level increases. The level at which the avoidance is required lowers as the avoidance requirement level lowers.

The avoidance requirement level is set for each frame, for example. The avoidance requirement levels are set to the avoidance regions 33 and 40 in accordance with generation of the avoidance region information.

Figure 35:
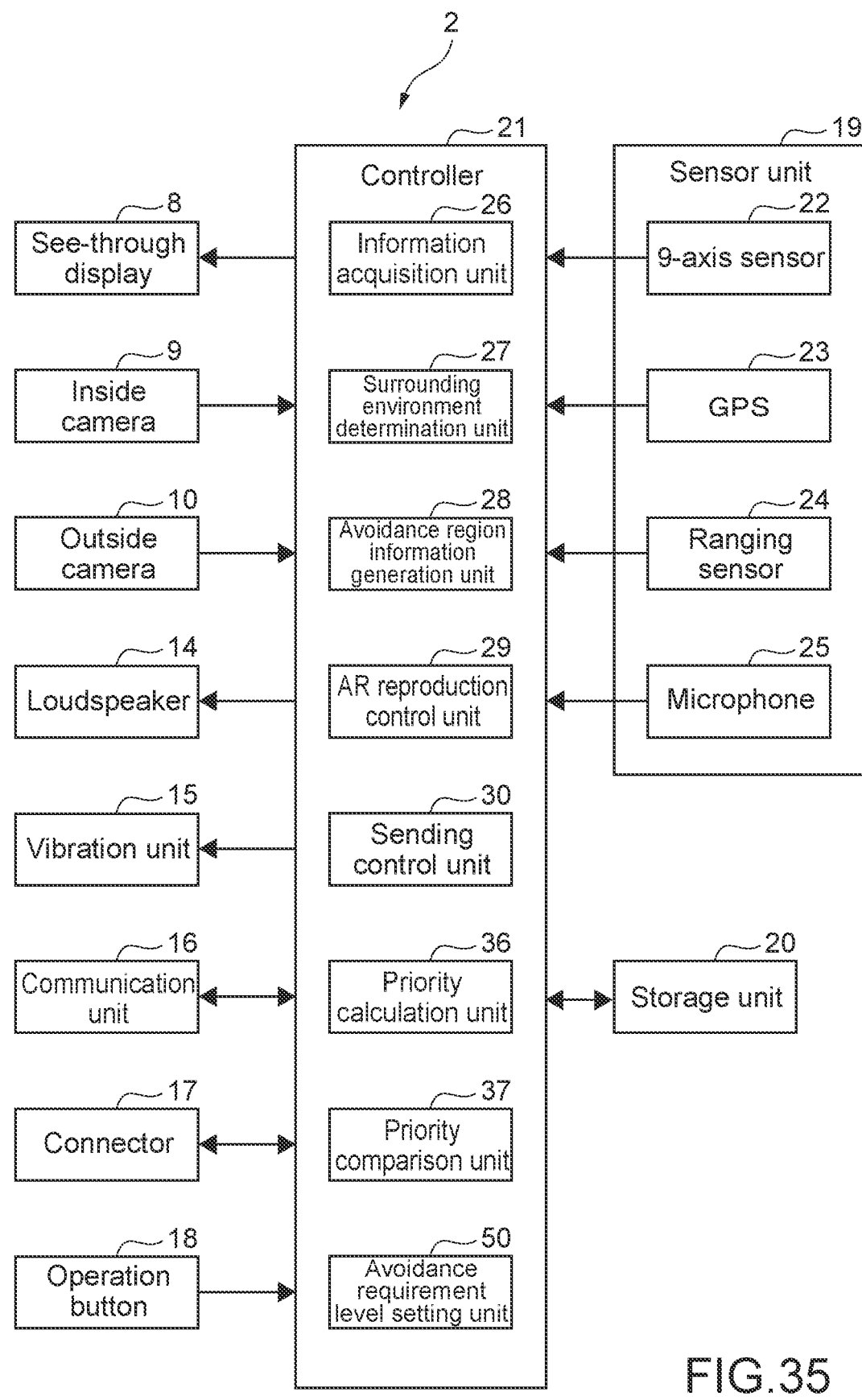
FIG. 35 A block diagram showing a functional configuration example of an HMD according to another embodiment.

As shown in FIG. 35, for example, the controller 21 configures an avoidance requirement level setting unit 50 for setting an avoidance requirement level.

For example, in the first embodiment, a step of setting the avoidance requirement level to the avoidance region 33 is provided between Steps 204 and 205 shown in FIG. 5.

In the second embodiment, for example, a step of setting the avoidance requirement level to the avoidance region 40 is provided between Steps 302 and 303. The sending control unit 30 sends the avoidance requirement level generated in this step to the HMD 2b. Thus, the avoidance requirement level set in this step is an avoidance requirement level for the other user 3b.

Figure 29:
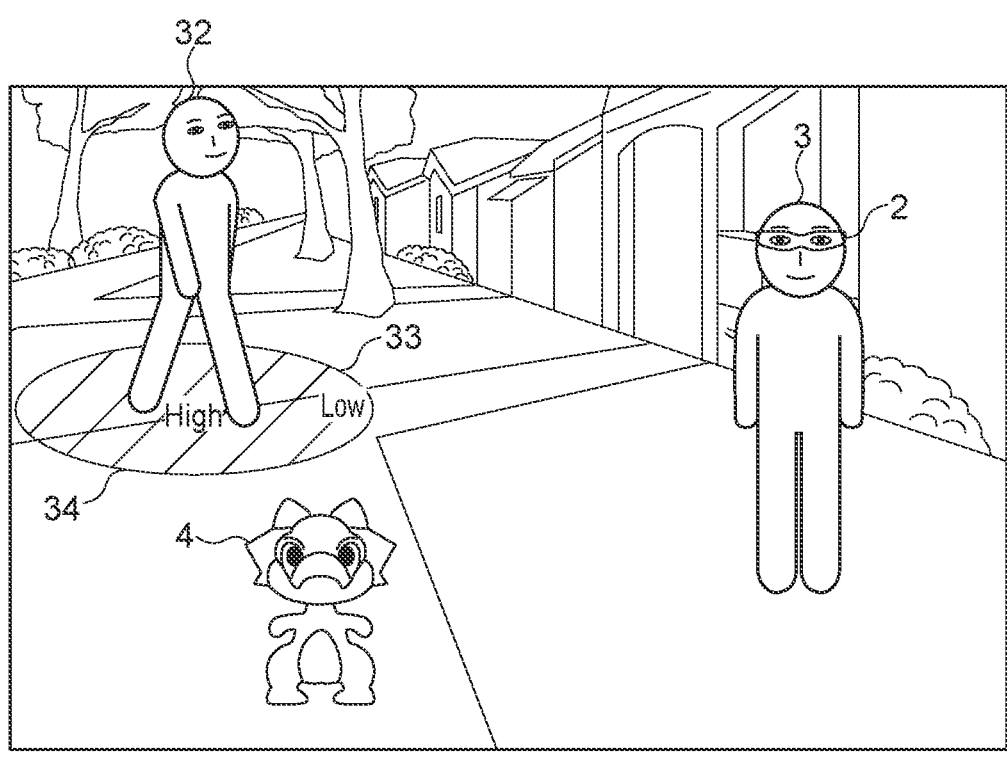
FIG. 29 A schematic diagram for describing setting of avoidance requirement levels.
Figure 30:
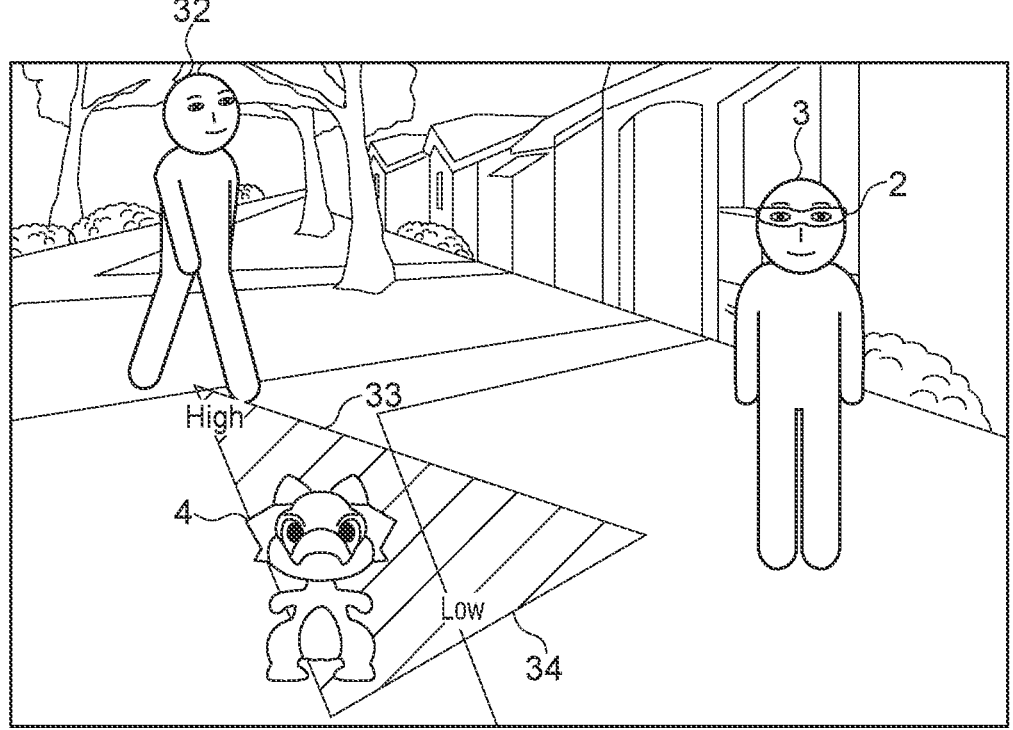
FIG. 30 A schematic diagram for describing setting of avoidance requirement levels.

In the example shown in FIGS. 29 and 30, for the avoidance region 33, the avoidance requirement level is set to be higher as it becomes closer to the other person 32. Then, the avoidance requirement level is set to be lower as a distance from the other person 32 increases. For example, 1.0, which is the maximum, is set as the avoidance requirement level for the position of the other person 32. The avoidance requirement level decreases as a linear function as the distance from the other person 32 increases. The avoidance requirement level becomes zero, which is the minimum, at a predetermined distance from the other person 32.

For example, the avoidance requirement level, zero, may be set for the furthest position from the other person 32 in the peripheral portion 34 of the avoidance region 33.

Figure 31:
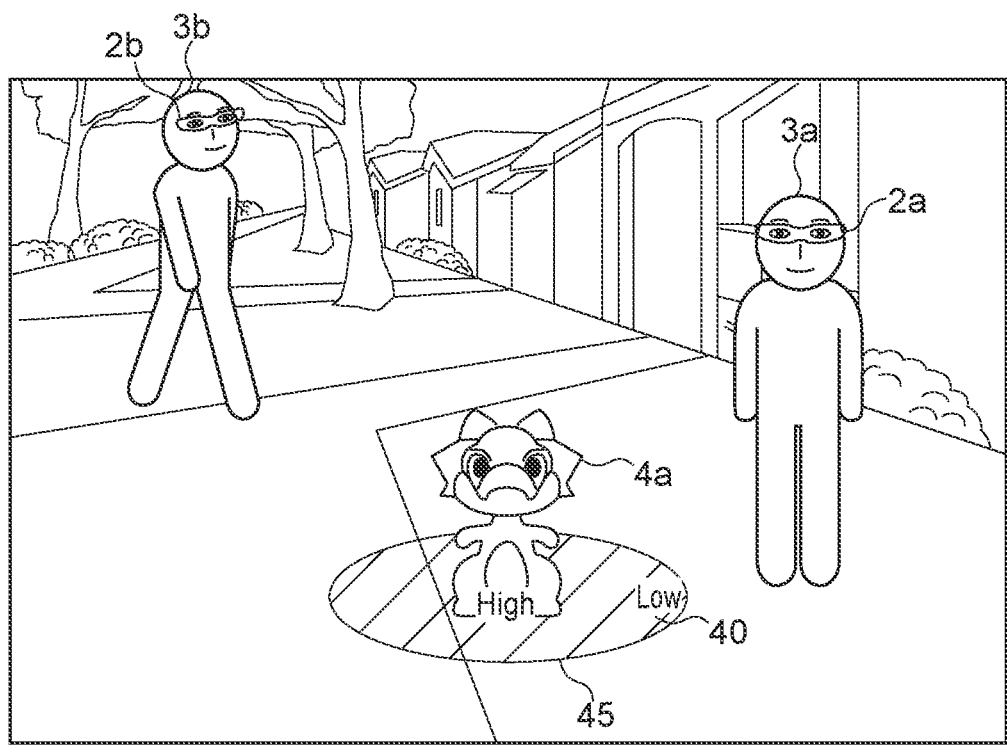
FIG. 31 A schematic diagram for describing setting of avoidance requirement levels.
Figure 32:
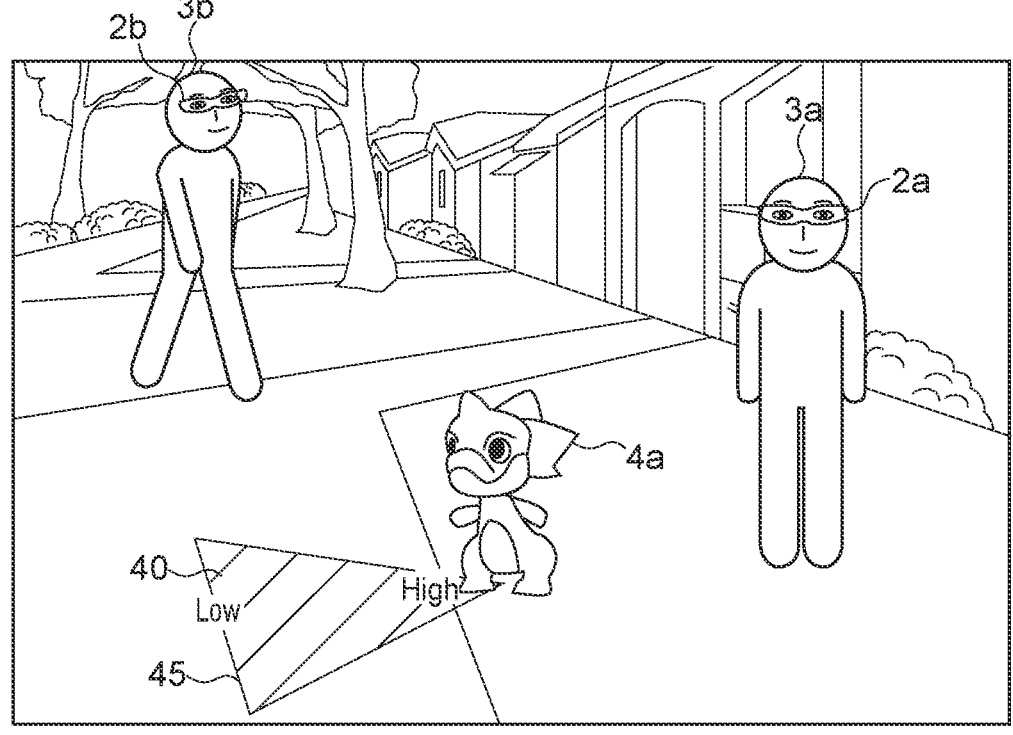
FIG. 32 A schematic diagram for describing setting of avoidance requirement levels.
Figure 33:
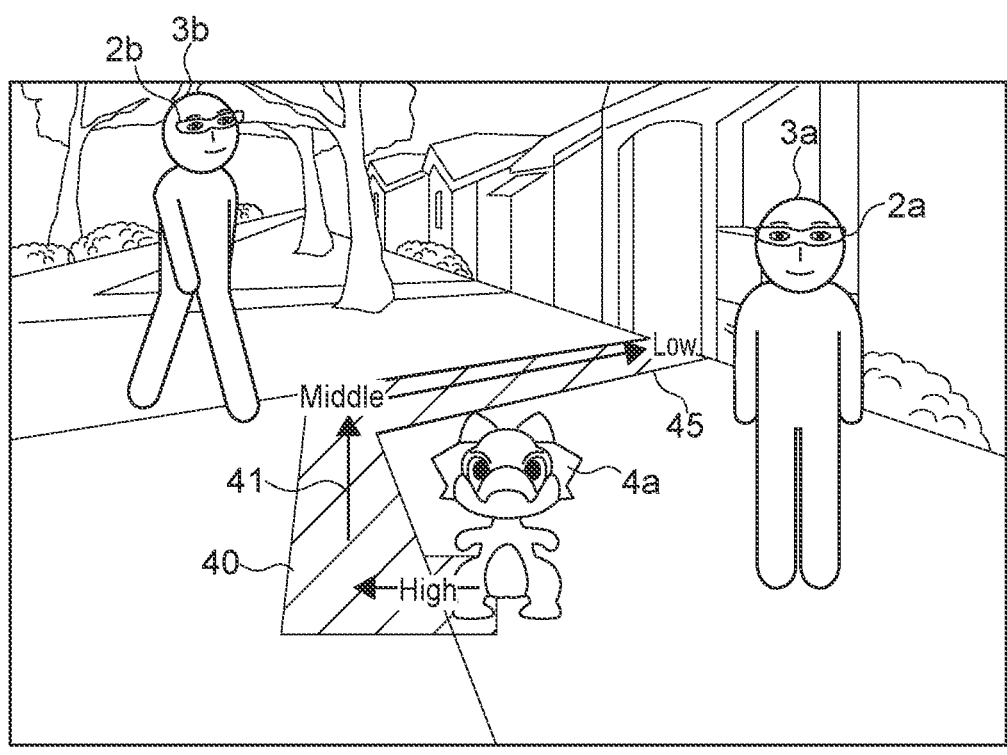
FIG. 33 A schematic diagram for describing setting of avoidance requirement levels.

In the example shown in FIGS. 31 to 33, for the avoidance region 40 for the other user 3b, the avoidance requirement level is set to be higher as it becomes closer to the virtual object 4a. Then, the avoidance requirement level is set to be lower as a distance from the virtual object 4a increases. For example, 1.0, which is the maximum, is set as the avoidance requirement level for the position of the virtual object 4a. The avoidance requirement level decreases as a linear function as it becomes further from the virtual object 4a. The avoidance requirement level becomes zero, which is the minimum, at a predetermined distance from the virtual object 4a.

For example, the avoidance requirement level, zero, may be set for the furthest position from the virtual object 4a in the peripheral portion 34 of the avoidance region 40.

In the example shown in FIG. 33, the avoidance requirement level lowers along the path 41 as a distance from the virtual object 4a increases.

The setting of the avoidance requirement level may be changed as appropriate depending on the kind of virtual object 4a. The highest avoidance requirement level set for the position of the virtual object 4a may be set as appropriate, for example, depending on the kind of virtual object 4a.

For example, with respect to the virtual object 4a of an important character such as a main character, the avoidance requirement level, 1.0, which is the maximum, is set for the position of the virtual object 4a. The avoidance requirement level lowers as the distance from the virtual object 4a increases.

On the other hand, with respect to the virtual object 4a of a less important character such as a sub-character, a relatively low avoidance requirement level, 0.5, is set for the position of the virtual object 4*a*. The avoidance requirement level lowers as the distance from the virtual object 4*a* increases.

Such a setting can preferentially prevent the occurrence of interference with the virtual object 4*a* of the important character.

It should be noted that the setting of the avoidance requirement level may be changed as appropriate depending on the kind of the other object in the case as shown in FIGS. 29 and 30.

The AR reproduction control unit 29 controls reproduction of the virtual content on the basis of the avoidance requirement level set to the avoidance regions 33 and 40.

For example, with respect to the position to which the higher avoidance requirement level is set, reproduction control to avoid the entrance of the user 3 or the virtual object 4*a* is executed.

Figure 34:
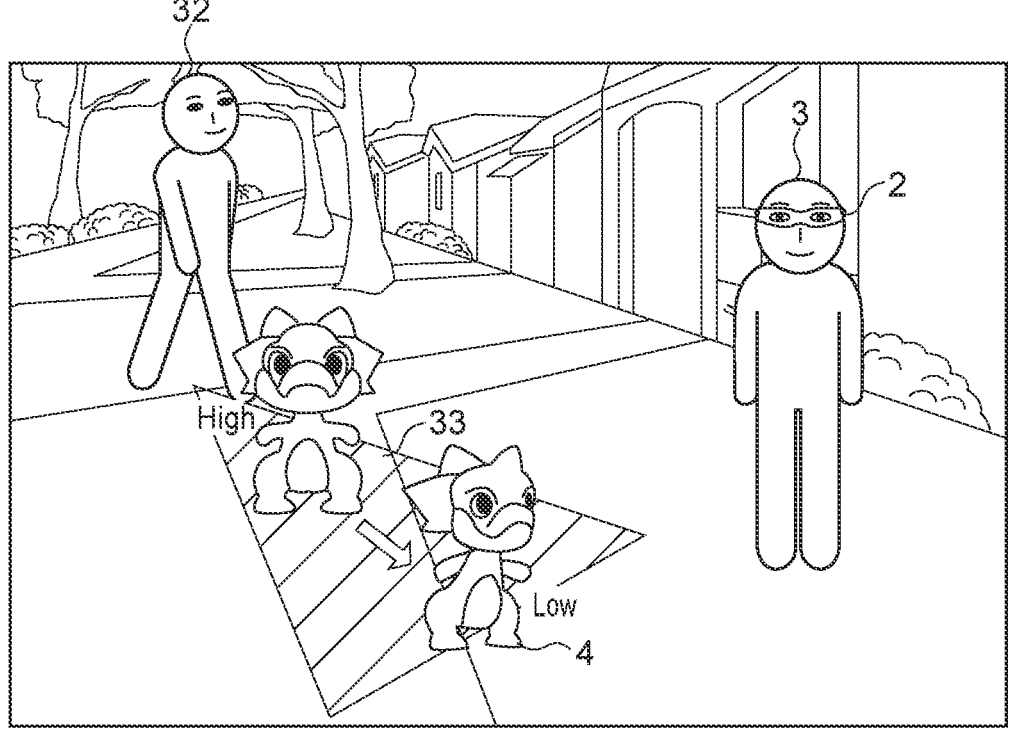
FIG. 34 A schematic diagram showing a reproduction control example based on the avoidance requirement levels.

For example, as shown in FIG. 34, in a case of moving the virtual object 4 from the avoidance region 33, the virtual object 4 is moved in a direction in which the avoidance requirement level lowers. For example, in a case where the virtual object 4 is located at the position with the avoidance requirement level of 0.8, the virtual object 4 is moved from there in a direction in which the avoidance requirement level becomes zero. No movement in a direction in which the avoidance requirement level increases is executed.

This allows more natural AR representation. The world view of the AR world can be kept.

A virtual object 4 that should avoid the entrance to the avoidance region 33 (40) and a virtual object 4 that does not need to avoid the entrance to the avoidance region 33 (40) may be classified on the basis of the kind or the like of the virtual object 4.

For example, the virtual object 4 of the character or the like is classified as the virtual object 4 that should avoid the entrance to the avoidance region 33 (40).

On the other hand, the virtual object 4 that does not affect the world view of the AR world even without avoiding the entrance to the avoidance region 33 (40), such as the virtual object 4 constituting the background, e.g., a wall or a building, is classified as the virtual object 4 that does not need to avoid the entrance to the avoidance region 33 (40).

For example, the above-mentioned various types of reproduction control are executed with respect to the virtual object 4 classified as the virtual object 4 that should avoid the entrance to the avoidance region 33 (40).

In the above description, the case of using the AR glass as the HMD 2 has been taken as the example, though not limited thereto. The present technology can also be applied in a case of using a virtual reality (VR) glass or the like as a video see-through HMD. Moreover, the present technology is not limited to the device such as the HMD put on the user's head. For example, the present technology can also be applied to AR representation using a smartphone, a tablet terminal, a personal computer (PC), or the like.

The technology described in the first embodiment and the technology described in the second embodiment may be combined. Alternatively, a configuration in which only the technology described in the first embodiment is executable or a configuration in which only the technology described in the second embodiment is executable may be employed.

In the above description, the case where the HMD 2 functions as the embodiment of the information processing apparatus according to the present technology has been taken as the example. The present technology is not limited thereto. Any computer such as a PC connected to the HMD 2 via a network or the like may achieve the embodiment of the information processing apparatus according to the present technology and may execute the information processing method according to the present technology. Moreover, cooperation of the HMD 2 with the computer in the network may achieve the embodiment of the information processing apparatus according to the present technology and may execute the information processing method according to the present technology.

For example, another computer connected to the HMD 2 may achieve some or all of the functional blocks achieved by the controller 21 shown in FIGS. 5 and 16.

Moreover, a common computer may achieve the "information processing apparatus" and the "other information processing apparatus".

Figure 36:
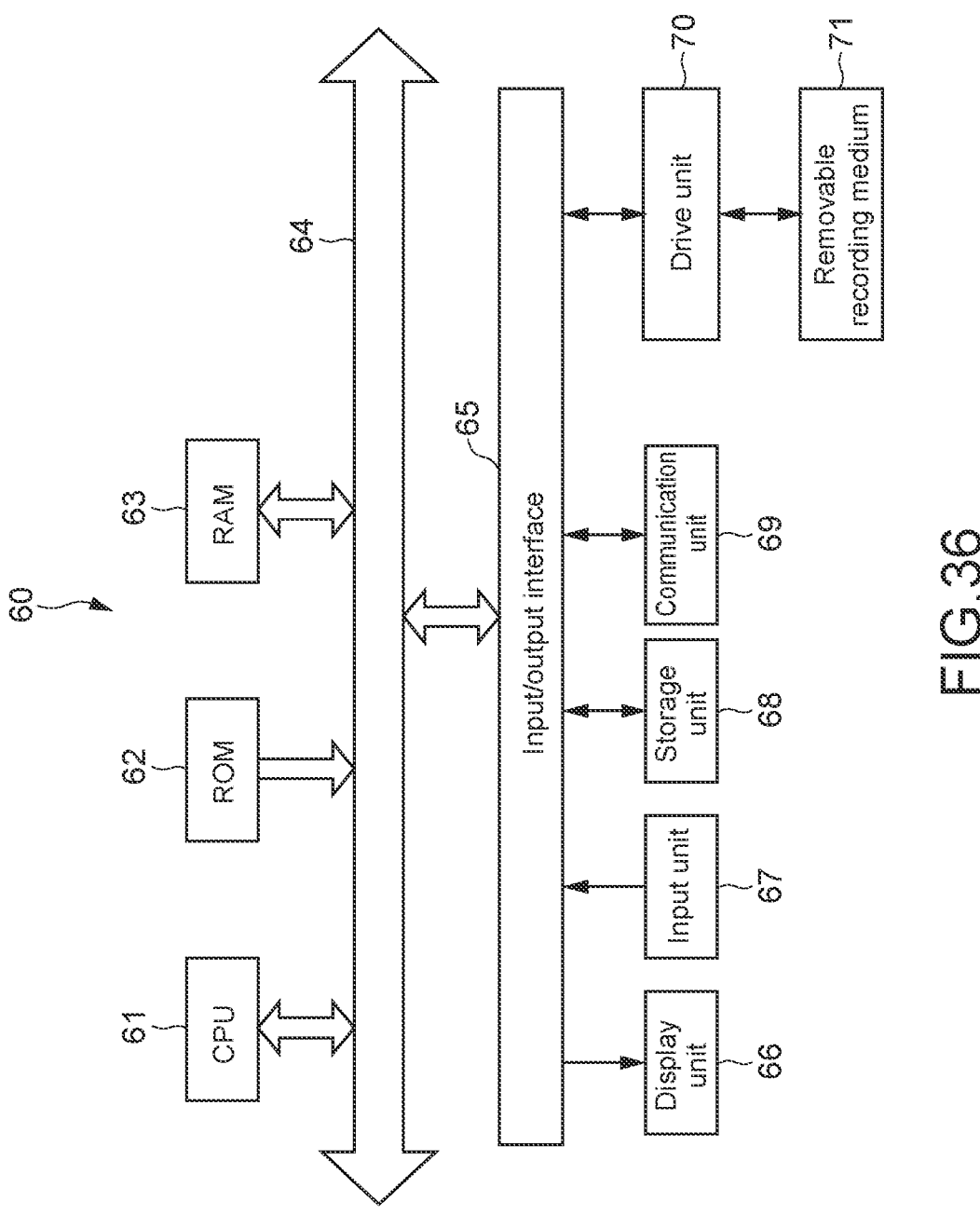
FIG. 36 A block diagram showing a hardware configuration example of a computer that can be applied to the present technology.

FIG. 36 is a block diagram showing a hardware configuration example of a computer 60 that can be applied to the present technology.

The computer 60 includes a CPU 61, a read only memory (ROM) 62, a RAM 63, an input/output interface 65, and a bus 64 for connecting them to one another. A display unit 66, an input unit 67, a storage unit 68, a communication unit 69, and a drive unit 70, for example, are connected to the input/output interface 65.

The display unit 66 is a display device using liquid-crystals or EL, for example. The input unit 67 is, for example, a keyboard, a pointing device, a touch panel, or another operation apparatus. In a case where the input unit 67 includes a touch panel, the display unit 66 can be integral with the touch panel.

The storage unit 68 is a nonvolatile storage device, and is, for example, an HDD, a flash memory, or another solid-state memory. The drive unit 70 is a device capable of driving a removable recording medium 71, e.g., an optical recording medium or a magnetic recording tape.

The communication unit 69 is a modem, a router, or another communication apparatus that is connectable to a LAN, a WAN, or the like and is for communicating with the other device. The communication unit 69 may perform wired communication or may perform wireless communication. The communication unit 69 is often used separate from the computer 60.

Cooperation of software stored in the storage unit 68 or the ROM 62, for example, with hardware resources for the computer 60 achieves the information processing by the computer 60 having the above-mentioned hardware configurations. Specifically, the information processing method according to the present technology is achieved by loading a program configuring the software, which has been stored in the ROM 62 or the like, to the RAM 63 and executing it.

The program is installed to the computer 60 via a recording medium 61, for example. Alternatively, the program may be installed to the computer 60 via a global network or the like. In addition, any computer-readable non-transitory storage medium may be used.

Cooperation of a plurality of computers connected to be capable of communicating via the network or the like may execute the information processing method and the program according to the present technology or create the information processing apparatus according to the present technology.

That is, the information processing method and the program according to the present technology can be executed not only in a computer system configured by a single computer but also in a computer system in which a plurality of computers cooperatively operate.

It should be noted that in the present disclosure, the system means a set of a plurality of components (apparatuses, modules (parts), and the like) and it does not matter whether or not all the components are housed in the same casing. Therefore, both a plurality of apparatuses housed in separate casings and connected to one another via a network and a single apparatus having a plurality of modules housed in a single casing are the system.

Executing the information processing method and the program according to the present technology by the computer system includes both executing, by a single computer, the avoidance region information acquisition, the avoidance region information generation, the priority calculation, the avoidance requirement level setting, and the reproduction control of the virtual content, for example, and executing these processes by different computers. Moreover, executing the respective processes by a predetermined computer includes causing another computer to execute some or all of those processes and acquiring the results.

That is, the information processing method and the program according to the present technology can also be applied to a cloud computing configuration in which a plurality of apparatuses shares and cooperatively processes a single function via a network.

The configurations, the processing flows, and the like such as the AR providing system, the HMD, and the virtual object described above with reference to the drawings are merely embodiments, and can be arbitrarily modified without departing from the gist of the present technology. That is, any other configurations, algorithms, and the like for carrying out the present technology may be employed.

In the present disclosure, for the sake of easy understanding, the wordings, "substantially", "almost", and "about" are used as appropriate. However, no clear difference is defined between a case with the wordings, "substantially", "almost", and "about" and a case without these wordings.

That is, in the present disclosure, it is assumed that the concepts that define the shape, the size, the position relationship, the state, and the like such as "center", "middle", "uniform", "equal", the "same", "orthogonal", "parallel", "symmetric", "extending", "axial", "columnar", "cylindrical", "ring-shaped", and "annular" are concepts including "substantially center", "substantially middle", "substantially uniform", "substantially equal", "substantially the same", "substantially orthogonal", "substantially parallel", "substantially symmetric", "substantially extending", "substantially axial", "substantially columnar", "substantially cylindrical", "substantially ring-shaped", "substantially annular", and the like.

For example, states included in a predetermined range (e.g., ±10% range) using "completely center", "completely middle", "completely uniform", "completely equal", "completely the same", "completely orthogonal", "completely parallel", "completely symmetric", "completely extending", "completely axial", "completely columnar", "completely cylindrical", "completely ring-shaped", "completely annular", and the like as the bases are also included.

Therefore, also a case where no wordings, "substantially", "almost", and "about" are added can include concepts that can be expressed by adding so-called "substantially", "almost", "about", and the like. On the contrary, states expressed with "substantially", "almost", "about", and the like does not necessarily exclude complete states.

In the present disclosure, the comparative expressions, e.g., "larger than A" or "smaller than A" are expressions encompassing both a concept including a case where it is equal to A and a concept not including a case where it is equal to A. For example, "larger than A" is not limited to the case where not including "equal to A", and also includes "A or more". Moreover, "smaller than A" is not limited to "less than A", and also includes "A or less".

For carrying out the present technology, specific settings and the like only need to be employed as appropriate on the basis of the concepts included in "larger than A" and "smaller than A" so as to provide the above-mentioned effects.

At least two of the features according to the present technology, which have been described above, may be combined. That is, the various features described in the respective embodiments may be arbitrarily combined across the respective embodiments. Moreover, the above-mentioned various effects are merely exemplary and not limitative, and other effects may be provided.

It should be noted that the present technology can also take the following configurations.

(1) An information processing apparatus, including:
    an acquisition unit that acquires avoidance region information about an avoidance region where at least one of entrance of a target person who is a target to whom virtual content is reproduced or entrance of a virtual object for the target person that is displayed to the target person is a target to be avoided, the avoidance region information being generated on the basis of at least one of a position of another object different from the target person or a position of a virtual object for the other object displayed to the other object; and
    a reproduction control unit that controls reproduction of the virtual content to the target person on the basis of the acquired avoidance region information.

(2) The information processing apparatus according to (1), in which
    the reproduction control unit controls at least one of display of the virtual object for the target person or output of a virtual sound to the target person.

(3) The information processing apparatus according to (1) or (2), in which
    the reproduction control unit executes at least one of reproduction of the virtual content for avoiding the entrance of the target person to the avoidance region or reproduction of the virtual content for avoiding the entrance of the virtual object for the target person to the avoidance region.

(4) The information processing apparatus according to any one of (1) to (3), in which
    the reproduction control unit moves the position of the virtual object for the target person outward from the avoidance region.

(5) The information processing apparatus according to any one of (1) to (4), in which
    the reproduction control unit reproduces the virtual content for guiding a gaze of the target person so that the virtual object for the target person included in the avoidance region departs from an effective field of view of the target person.

(6) The information processing apparatus according to any one of (1) to (5), further including
    a generation unit that generates the avoidance region information on the basis of periphery information about a periphery of the target person.

(7) The information processing apparatus according to (6), in which
    the generation unit generates the avoidance region information on the basis of at least one of a motion of the other object or a motion of the virtual object for the other object.

(8) The information processing apparatus according to (6) or (7), in which
the generation unit generates the avoidance region information including a region of a predetermined range as the avoidance region, the predetermined range using the position of the other object as a basis.
(9) The information processing apparatus according to any one of (1) to (8), in which
the other object is another target person who is a target to whom another information processing apparatus reproduces the virtual content.
(10) The information processing apparatus according to (9), in which
the generation unit generates avoidance region information for the other target person on the basis of at least one of a position of the target person or a position of the virtual object for the target person.
(11) The information processing apparatus according to (9) or (10), further including
a sending control unit that sends avoidance region information for the other target person to the other information processing apparatus.
(12) The information processing apparatus according to any one of (9) to (11), further including
a priority calculation unit that calculates a priority for reproduction of the virtual content based on the avoidance region information.
(13) The information processing apparatus according to (12), in which
the sending control unit sends the calculated priority to the other information processing apparatus.
(14) The information processing apparatus according to (13), in which
the reproduction control unit compares the priority calculated by the priority calculation unit with the priority of the other target person sent from the other information processing apparatus and controls reproduction of the virtual content on the basis of the avoidance region information sent from the other information processing apparatus in a case where the priority of the other target person is higher.
(15) The information processing apparatus according to (13) or (14), in which
the reproduction control unit compares the priority calculated by the priority calculation unit with the priority of the other target person sent from the other information processing apparatus and does not control reproduction of the virtual content based on the avoidance region information sent from the other information processing apparatus in a case where the priority of the other target person is lower.
(16) The information processing apparatus according to any one of (1) to (15), further including
an avoidance requirement level setting unit that sets an avoidance requirement level indicating how much avoidance is required with respect to an avoidance region included in the avoidance region information, and
the reproduction control unit controls reproduction of the virtual content on the basis of the avoidance requirement level.
(17) The information processing apparatus according to any one of (10) to (15), in which
the avoidance requirement level setting unit sets the avoidance requirement level with respect to an avoidance region included in the avoidance region information for the other target person, and

the sending control unit sends the set avoidance requirement level to the other information processing apparatus.
(18) An information processing method, including:
by a computer system,
acquiring avoidance region information about an avoidance region where at least one of entrance of a target person who is a target to whom virtual content is reproduced or entrance of a virtual object for the target person that is displayed to the target person is a target to be avoided, the avoidance region information being generated on the basis of at least one of a position of another object different from the target person or a position of a virtual object for the other object displayed to the other object; and
controlling reproduction of the virtual content to the target person on the basis of the acquired avoidance region information.
(19) A program that causes a computer system to execute the steps of:
acquiring avoidance region information about an avoidance region where at least one of entrance of a target person who is a target to whom virtual content is reproduced or entrance of a virtual object for the target person that is displayed to the target person is a target to be avoided, the avoidance region information being generated on the basis of at least one of a position of another object different from the target person or a position of a virtual object for the other object displayed to the other object; and
controlling reproduction of the virtual content to the target person on the basis of the acquired

REFERENCE SIGNS LIST

1 AR providing system
2, 2a, 2b HMD
3, 3a, 3b user
4, 4a, 4b virtual object
21 controller
26 information acquisition unit
27 surrounding environment determination unit
28 avoidance region information generation unit
29 AR reproduction control unit
30 sending control unit
32 other person
33 avoidance region
36 priority calculation unit
37 priority comparison unit
38, 38a, 38b effective field of view
40 avoidance region for other user
60 computer

The invention claimed is:
1. An information processing apparatus, comprising:
circuitry configured to
acquire avoidance region information about an avoidance region where at least one of entrance of a target person who is a target to whom virtual content is reproduced or entrance of a virtual object for the target person that is displayed to the target person is a target to be avoided, the avoidance region information being generated based on at least one of a position of another object different from the target person or a position of a virtual object for the other object displayed to the other object, and control reproduction of the virtual content to the target person based on the acquired avoidance region information, wherein the circuitry determines whether to control reproduction of the virtual content according to a comparison between a priority for reproduction of the virtual content calculated for the circuitry and a priority for reproduction of the virtual content calculated for another processing apparatus that reproduces the virtual content.

2. The information processing apparatus according to claim 1, wherein the circuitry controls the reproduction of the virtual content by controlling at least one of display of the virtual object for the target person or output of a virtual sound to the target person.

3. The information processing apparatus according to claim 1, wherein the circuitry controls the reproduction of the virtual content by executing at least one of reproduction of the virtual content for avoiding the entrance of the target person to the avoidance region or reproduction of the virtual content for avoiding the entrance of the virtual object for the target person to the avoidance region.

4. The information processing apparatus according to claim 1, wherein the circuitry controls the reproduction of the virtual content by moving the position of the virtual object for the target person outward from the avoidance region.

5. The information processing apparatus according to claim 1, wherein the circuitry controls the reproduction of the virtual content by reproducing the virtual content for guiding a gaze of the target person so that the virtual object for the target person included in the avoidance region departs from an effective field of view of the target person.

6. The information processing apparatus according to claim 1, wherein the circuitry is further configured to generate the avoidance region information based on periphery information about a periphery of the target person.

7. The information processing apparatus according to claim 6, wherein the circuitry generates the avoidance region information based on at least one of a motion of the other object or a motion of the virtual object for the other object.

8. The information processing apparatus according to claim 6, wherein the circuitry generates the avoidance region information including a region of a predetermined range as the avoidance region, the predetermined range using the position of the other object as a basis.

9. The information processing apparatus according to claim 1, wherein the other object includes another target person who is a target to whom the other information processing apparatus reproduces the virtual content.

10. The information processing apparatus according to claim 9, wherein the circuitry is further configured to generate avoidance region information for the other target person based on at least one of a position of the target person or a position of the virtual object for the target person.

11. The information processing apparatus according to claim 10, wherein the circuitry is further configured to set an avoidance requirement level with respect to an avoidance region included in the avoidance region information for the other target person, and wherein the circuitry is further configured to send the set avoidance requirement level to the other information processing apparatus.

12. The information processing apparatus according to claim 9, wherein the circuitry is further configured to send avoidance region information for the other target person to the other information processing apparatus.

13. The information processing apparatus according to claim 9, wherein the circuitry is further configured to calculate the priority for reproduction of the virtual content based on the avoidance region information.

14. The information processing apparatus according to claim 13, wherein the circuitry is further configured to send the calculated priority to the other information processing apparatus.

15. The information processing apparatus according to claim 14, wherein the circuitry is further configured to compare the priority calculated by the circuitry with the priority of the other target person sent from the other information processing apparatus and the circuitry controls reproduction of the virtual content based on the avoidance region information sent from the other information processing apparatus in a case where the priority of the other target person is higher.

16. The information processing apparatus according to claim 14, wherein the circuitry is further configured to compare the priority calculated by the circuitry with the priority of the other target person sent from the other information processing apparatus and the circuitry does not control reproduction of the virtual content based on the avoidance region information sent from the other information processing apparatus in a case where the priority of the other target person is lower.

17. The information processing apparatus according to claim 1, wherein the circuitry is further configured to set an avoidance requirement level indicating how much avoidance is required with respect to an avoidance region included in the avoidance region information, and wherein the circuitry controls reproduction of the virtual content based on the avoidance requirement level.

18. An information processing method, executed by a computer system, the method comprising:

acquiring avoidance region information about an avoidance region where at least one of entrance of a target person who is a target to whom virtual content is reproduced or entrance of a virtual object for the target person that is displayed to the target person is a target to be avoided, the avoidance region information being generated based on at least one of a position of another object different from the target person or a position of a virtual object for the other object displayed to the other object; and controlling reproduction of the virtual content to the target person based on the acquired avoidance region information, wherein it is determined whether to control reproduction of the virtual content according to a comparison between a priority for reproduction of the virtual content calculated for the computer system and a priority for reproduction of the virtual content calculated for another processing apparatus that reproduces the virtual content.

19. A non-transitory computer-readable storage medium having embodied thereon a program, which when executed by a computer system causes the computer system to execute a method, the method comprising:

acquiring avoidance region information about an avoidance region where at least one of entrance of a target person who is a target to whom virtual content is reproduced or entrance of a virtual object for the target person that is displayed to the target person is a target to be avoided, the avoidance region information being generated based on at least one of a position of another object different from the target person or a position of a virtual object for the other object displayed to the other object; and controlling reproduction of the virtual content to the target person based on the acquired avoidance region information, wherein it is determined whether to control reproduction of the virtual content according to a comparison between a priority for reproduction of the virtual content calculated for the computer system and a priority for reproduction of the virtual content calculated for another processing apparatus that reproduces the virtual content.

* * * * *